United States Patent
Ghaemmaghami et al.

(10) Patent No.: US 11,900,947 B2
(45) Date of Patent: Feb. 13, 2024

(54) METHOD AND SYSTEM FOR AUTOMATICALLY DIARISING A SOUND RECORDING

(71) Applicant: FTR LABS PTY LTD, Brisbane (AU)

(72) Inventors: Houman Ghaemmaghami, Tarragindi (AU); Shahram Kalantari, Kangaroo Point (AU); David Dean, Auchenflower (AU); Subramanian Sridharan, Brisbane (AU)

(73) Assignee: FTR LABS PTY LTD, Brisbane (AU)

( * ) Notice: Subject to any disclaimer, the term of this patent is extended or adjusted under 35 U.S.C. 154(b) by 259 days.

(21) Appl. No.: 17/184,323

(22) Filed: Feb. 24, 2021

(65) Prior Publication Data

US 2021/0183395 A1    Jun. 17, 2021

Related U.S. Application Data

(62) Division of application No. 16/316,708, filed as application No. PCT/AU2017/050713 on Jul. 11, 2017, now Pat. No. 10,964,329.

(30) Foreign Application Priority Data

Jul. 11, 2016 (AU) ................................ 2016902710

(51) Int. Cl.
*G10L 17/02* (2013.01)
*G10L 17/04* (2013.01)
(Continued)

(52) U.S. Cl.
CPC .............. *G10L 17/06* (2013.01); *G10L 17/02* (2013.01); *G10L 17/04* (2013.01); *G10L 21/0272* (2013.01); *G10L 25/78* (2013.01)

(58) Field of Classification Search
CPC ..... G10L 17/02; G10L 17/0272; G10L 17/04; G10L 17/06
See application file for complete search history.

(56) References Cited

U.S. PATENT DOCUMENTS 6,421,645 B1   7/2002 Beigi et al.
6,424,946 B1   7/2002 Tritschler et al.
(Continued)

FOREIGN PATENT DOCUMENTS

| EP | 3117428 B1 * | 11/2018 | ............... G08G 3/00 |
| WO | WO-02103681 A1 * | 12/2002 | ......... G07C 9/00087 |
| WO | WO-2017162281 A1 * | 9/2017 | ............. G10L 15/26 |

OTHER PUBLICATIONS

Dehak, Najim, Pierre Dumouchel, and Patrick Kenny. "Modeling prosodic features with joint factor analysis for speaker verification." IEEE Transactions on Audio, Speech, and Language Processing 15.7: 2095-2103. (Year: 2007).*

(Continued)

*Primary Examiner* — Daniel C Washburn
*Assistant Examiner* — Oluwadamilola M Ogunbiyi
(74) *Attorney, Agent, or Firm* — Cooley LLP

(57) ABSTRACT

Embodiments of the present invention provide methods and systems for performing automatic diarisation of sound recordings including speech from one more speakers. The automatic diarisation has a development or training phase and a utilisation or evaluation phase. In the development or training phase background models and hyperparameters are generated from already annotated sound recordings. These models and hyperparameters are applied during the evaluation or utilisation phase to diarise new or not previously diarised or annotated recordings.

3 Claims, 16 Drawing Sheets

(51) Int. Cl.
    *G10L 17/06*     (2013.01)
    *G10L 21/0272*     (2013.01)
    *G10L 25/78*     (2013.01)

(56) References Cited

U.S. PATENT DOCUMENTS

| | | | |
|---|---|---|---|
| 6,898,277 B1* | 5/2005 | Meteer | H04M 3/5166 379/265.06 |
| 7,295,970 B1 | 11/2007 | Gorin et al. | |
| 8,913,103 B1* | 12/2014 | Sargin | G06V 40/16 348/14.12 |
| 9,558,762 B1* | 1/2017 | Sieracki | G10L 17/06 |
| 10,008,209 B1* | 6/2018 | Qian | G10L 17/18 |
| 10,964,329 B2 | 3/2021 | Ghaemmaghami et al. | |
| 2004/0260550 A1 | 12/2004 | Burgers et al. | |
| 2006/0253284 A1* | 11/2006 | Mami | G10L 17/06 704/E17.007 |
| 2008/0046241 A1 | 2/2008 | Osburn et al. | |
| 2008/0215324 A1 | 9/2008 | Hirohata | |
| 2009/0119103 A1* | 5/2009 | Gerl | G10L 17/04 704/250 |
| 2009/0319269 A1 | 12/2009 | Aronowitz | |
| 2011/0119060 A1 | 5/2011 | Aronowitz | |
| 2011/0213664 A1* | 9/2011 | Osterhout | G06F 3/013 705/14.58 |
| 2011/0251843 A1 | 10/2011 | Aronowitz | |
| 2012/0065974 A1* | 3/2012 | Hagai | G10L 17/04 704/E15.001 |
| 2012/0173234 A1* | 7/2012 | Fujimoto | G10L 15/20 704/E15.039 |
| 2012/0232900 A1* | 9/2012 | Brummer | G10L 17/02 704/239 |
| 2012/0237042 A1 | 9/2012 | Hirohata et al. | |
| 2013/0006653 A1 | 1/2013 | Aronowitz et al. | |
| 2014/0029757 A1 | 1/2014 | Aronowitz et al. | |
| 2014/0214417 A1* | 7/2014 | Wang | G10L 17/02 704/232 |
| 2014/0222423 A1 | 8/2014 | Cumani et al. | |
| 2014/0222428 A1 | 8/2014 | Cumani et al. | |
| 2014/0245367 A1 | 8/2014 | Sasaki et al. | |
| 2014/0278417 A1 | 9/2014 | Chen et al. | |
| 2014/0278418 A1* | 9/2014 | Chen | G10L 19/005 704/246 |
| 2015/0025887 A1* | 1/2015 | Sidi | G10L 17/02 704/245 |
| 2015/0082349 A1* | 3/2015 | Ishtiaq | H04N 21/4316 725/40 |
| 2015/0310863 A1 | 10/2015 | Chen et al. | |
| 2016/0071520 A1* | 3/2016 | Hayakawa | G10L 17/04 704/247 |
| 2016/0098987 A1* | 4/2016 | Stolcke | G10L 15/16 704/232 |
| 2016/0111112 A1 | 4/2016 | Hayakawa | |
| 2016/0225374 A1* | 8/2016 | Rodriguez | G10L 17/10 |
| 2016/0248768 A1* | 8/2016 | McLaren | H04L 63/102 |
| 2016/0283185 A1* | 9/2016 | McLaren | G10L 25/54 |
| 2016/0365096 A1 | 12/2016 | Bocklet et al. | |
| 2017/0040016 A1* | 2/2017 | Cui | G10L 15/02 |
| 2017/0069313 A1* | 3/2017 | Aronowitz | G10L 19/02 |
| 2017/0084295 A1* | 3/2017 | Tsiartas | G10L 17/08 |
| 2017/0124311 A1 | 5/2017 | Li et al. | |
| 2017/0169816 A1* | 6/2017 | Blandin | G06F 16/683 |
| 2017/0194003 A1* | 7/2017 | Wang | G10L 17/04 |
| 2017/0194004 A1* | 7/2017 | Lousky | G10L 17/04 |
| 2017/0236520 A1* | 8/2017 | Borgstrom | G10L 17/12 704/239 |
| 2017/0263257 A1* | 9/2017 | Tsujikawa | G10L 17/02 |
| 2017/0286407 A1* | 10/2017 | Chochowski | G10L 15/26 |
| 2017/0287482 A1 | 10/2017 | Jackson | |
| 2017/0323643 A1* | 11/2017 | Arslan | G10L 19/018 |
| 2017/0372725 A1 | 12/2017 | Khoury et al. | |
| 2018/0005633 A1* | 1/2018 | Bocklet | G10L 17/24 |
| 2018/0211670 A1* | 7/2018 | Gorodetski | G10L 17/04 |
| 2018/0336902 A1* | 11/2018 | Cartwright | G06F 16/61 |
| 2019/0122669 A1* | 4/2019 | Li | G10L 17/06 |

OTHER PUBLICATIONS

Yin, Shou-Chun, Richard Rose, and Patrick Kenny. "A joint factor analysis approach to progressive model adaptation in text-independent speaker verification." IEEE Transactions on Audio, Speech, and Language Processing 15.7: 1999-2010. (Year: 2007).*

Zhao, Xianyu, and Yuan Dong. "Variational bayesian joint factor analysis models for speaker verification." IEEE transactions on audio, speech, and language processing 20.3: 1032-1042. (Year: 2011).*

Hasan, Taufiq, and John HL Hansen. "Acoustic factor analysis for robust speaker verification." IEEE Transactions on audio, speech, and language processing 21.4: 842-853. (Year: 2012).*

Verma, Pulkit, and Pradip K. Das. "i-Vectors in speech processing applications: a survey." International Journal of Speech Technology 18: 529-546. (Year: 2015).*

Anguera Miro, et al. "Speaker Diarization: A Review of Recent Research," in IEEE Transactions on Audio, Speech, and Language Processing, Feb. 2012, 20(2), 356-370, doi: 10.1109/TASL.2011.212954.

Cheng et al. "BIC-Based Speaker Segmentation Using Divide-and-Conquer Strategies with Application to Speaker Diarization," in IEEE Transactions on Audio, Speech, and Language Processing, Jan. 2010, 18(1), 141-157, doi:10.1109/TASL.2009.2024730.

Desplangues, et al., "Factors analysis for speaker segmentation and improved speaker diarization." 16th annual conference of the international speech communication association (Interspeech 2015). International Speech and Communication Association (ISCA), 2014. (Year: 2015).

Geiger et al., "GMM-UBM Based Open-Set Online Speaker Diarization," Eleventh Annual Conference of the International Speech Communication Associated, 2010, retrieved from the internet on Sep. 13, 2017 [https://citeseerx.ist.psu.edu/viewdoc/download?doi=10.1.1.364.5224&rep=rep1&tpe=pdf], 1-4.

Ghaemmaghami et al., "A Cluster-Voting Approach for Speaker Diarization and Linking of Australian Broadcast News Recordings," Acoustics, Speech and Signal Processing (ICASSP), 2015 IEEE International Conference on IEEE, 2015, retrieved from the internet on Sep. 13, 2017 [http://eprints.qut.edu.au/85159/Houman_paper2_ICASSP15.pdf, 1-6.

International Search Report and Written Opinion dated Sep. 18, 2017, in connection with International Patent Application No. PCT/AU2017/050713, 1-13.

Nwe et al., "Speaker Diarization in Meeting Audio," 2009 IEEE International Conference on Acoustics, Speech and Signal Processing, Taipei, 2009, 4073-4076, doi: 10.1109/ICASSP.2009.4960523.

Partial Supplementary European Search Report dated Feb. 13, 2020, in connection with European Patent Application No. 17826680.5, filed Jul. 11, 2017.

Tranter et al., "An Overview of Automatic Speaker Diarisation Systems," IEEE Transactions on Speech and Audio Processing, Jan. 1, 2006, 14(5), XP055456243, 1-7.

Tranter et al., "An Overview of Automatic Speaker Diarization Systems," IEEE Transactions on Audio, Speech, and Language Processing, 15(15), Sep. 5, 2006, retrieved from the internet on Sep. 12, 2017 [https://mistral.univ-avignon.fr/doc/publis/06_IEEE-TASP_Tanter.pdf], 1-9.

Shum et al., "Exploiting intra-conversation variability for speaker diarization," Twelfth Annual Conference of the International Speech Communication Association, 2011, 945-948.

Zhu et al., "Scene change detection based on audio and video content analysis," Proceedings Fifth International Conference on Computational Intelligence and Multimedia Applications. ICCIMA 2003, Xi'an, China, 2003, 229-234, doi: 10.1109/ICCIMA.2003.1238130.

Extended European Search Report for European Application No. EP22191035.9 dated Nov. 30, 2022, 9 pages.

(56) References Cited

OTHER PUBLICATIONS

Moattar, M.H., et al., "A review on speaker diarization systems and approaches", Speech Communication, May 29, 2012, 54(10):1065-1103.

Prazak, J., et al., "Speaker Diarization Using PLDA-based Speaker Clustering", Intelligent Data Acquisition and Advanced Computing Systems (IDAACS), 2011 IEEE 6th International Conference On, IEEE, Sep. 15-17, 2011, 347-350.

Reynolds, D.A., et al., "Speaker Verification Using Adapted Gaussian Mixture Models", Digital Signal Processing, 2000, 10:19-41.

Sinha, R., et al., "High-Quality voice model for Statistical parametric speech Synthesis View project", Sep. 7, 2005, retrieved from the Internet: URL: https://www.researchgate.net/profile/Rohit-Sinha-16/publication/221479808_The_Cambridge_University_March_2005_speaker_diarisation_system/links/53fe09fd0cf283c3583a76a1/The-Cambridge-University-March-2005-speaker-diarisation-system.pdf [retrieved on Nov. 18, 2022], 13 pages.

* cited by examiner

METHOD AND SYSTEM FOR AUTOMATICALLY DIARISING A SOUND RECORDING

CROSS REFERENCE TO RELATED APPLICATIONS

This application is a divisional of U.S. patent application Ser. No. 16/316,708, filed Jul. 11, 2017, now U.S. Pat. No. 10,964,329, which is a continuation of U.S. national phase filing under 35 U.S.C. § 371 of International Application No. PCT/AU2017/050713, filed Jul. 11, 2017, and claims priority thereto under 35 U.S.C. § 119 to Australian Patent Application No. 2016902710, filed Jul. 11, 2016, the disclosures of which are incorporated herein by reference in their entirety.

TECHNICAL FIELD

The field of the invention is diarisation for voice transcription and in particular automated diarisation of audio files recording spoken proceedings.

BACKGROUND TO THE INVENTION

Diarisation is the segmentation of an audio recording into sections according to speaker. Diarisation is used for annotating audio transcriptions to attribute sections of the transcription to different speakers.

Manual diarisation requires and individual to listen to the audio file. In manual diarisation the individual manually identifies different speakers and annotates the audio file appropriately when the speakers change, for example adding bookmarks and metadata. However, this is a time consuming and labour-intensive process. Often manual diarisation is performed in conjunction with transcription of the audio file, but there are circumstances where it is desirable to have diarisation information before transcription or without transcription, such as identifying relevant portions of an audio file for transcription or to listen to, indexing audio files for searching, speaker tracking etc.

Attempts have been made at automating the diarisation process using signal processing techniques to analyse audio files to identify changes in speakers. One known commercial system is used for diarisation of broadcast news for searching purposes and optionally captioning (for example a system used by the BBC). This system operates on relatively short recordings of typically a few minutes in length.

A problem with these systems is that they are computationally expensive and thus impractical for use with long audio files. Further each of these systems has been developed for use with data input from a single audio channel, and typically well produced broadcast quality audio recordings.

However, in some contexts, diarisation and transcription of long proceedings or conversations is required, for example legal proceedings, board meetings, parliamentary sittings etc. Recordings in such contexts often exhibit large linguistic variations for individual speakers over the course of a proceeding, many individual speakers and some overlap or over speaking. Further depending on the nature of the proceeding the audio recording may comprise multiple channels and "spill over" between channels. In such contexts the methodologies of systems discussed above, typically applied to short recordings, tend to prove too inaccurate and computationally expensive to be reliably or effectively used.

There is a need for alternative methods as systems for diarisation of long duration audio recordings.

SUMMARY OF THE INVENTION

According to one aspect there is provided a method of automatically diarising a sound recording to automatically identify different speakers within the sound recording, the method being implemented in a computer system based diarisation system comprising a system controller, digital signal processor and memory, the method comprising the steps of:

a) accessing the sound recording;
b) performing feature extraction on the recording, the feature extraction extracting features compatible with speech characterisation models stored in system memory, the speech characterisation models including at least a universal background model;
c) segmenting the extracted features into a first feature set comprising a plurality of first feature segment elements each element comprising the features of a sequential recording segment having a first length;
d) segmenting the extracted features into a second feature set comprising a plurality of second feature segment elements each element comprising the features of a sequential recording segment having a second length, wherein the second length is longer than the first length, whereby each second feature segment element overlaps at least portions of two or more first feature segment elements;
e) modelling each first feature segment element based on the extracted features therein and speech characterisation models stored in memory;
f) comparing consecutive modelled first feature segment elements in the first feature set to identify speaker changes sequentially between modelled first feature segment elements in the first feature set;
g) combining the extracted features of each consecutive first feature segment element between identified speaker changes and modelling the combined extracted features to provide one or more modelled speaker contiguous first feature segments for the first feature set;
h) comparing the one or more modelled speaker contiguous first feature segments to identify all modelled speaker contiguous first feature segments within the first feature set that appear to be spoken by a same speaker based on modelled speaker characteristics;
i) modelling each second feature segment element based on the extracted features therein and speech characterisation models stored in memory;
j) comparing consecutive modelled second feature segment elements in the second feature set to identify speaker changes sequentially between modelled second feature segment elements in the second feature set;
k) combining the extracted features of each consecutive second feature segment element between identified speaker changes and modelling the combined extracted features to provide one or more modelled speaker contiguous second feature segments;
l) comparing the one or more modelled speaker contiguous second feature segments to identify all modelled speaker contiguous second feature segments within the second feature set that appear to be spoken by a same speaker based on modelled speaker characteristics;
m) combining the speaker identification outcomes for the first feature set and the second feature set to refine the identification of first feature segment elements and second feature segment elements apparently spoken by the same speaker; and n) generating a speaker diarisation output identifying timing of sequential speaker changes and a speaker identifier for each sequential change.

The speech characterisation models can include at least one non-speech characterisation model.

In an embodiment the method further comprises performing voice activity detection on each first feature segment element to classify each first feature segment element as speech or non-speech.

In an embodiment the method further comprises modelling non-speech first feature segment elements and comparing modelled non-speech segments during combining the speaker identification outcomes for the first feature set and the second feature set to refine the speaker identification.

In an embodiment comparing modelled speaker contiguous first feature segments and modelled speaker contiguous second feature segments is performed using a clustering methodology.

In an embodiment the second length is an integer multiple of the first length, whereby each second feature segment element overlaps two or more first feature segment elements. For example in an embodiment the integer multiple is 2. For example, the first length can be 2 seconds and the second length can be 4 seconds.

In an embodiment the speech characterisation models are generated via training process wherein one or more annotated recording are processed to generate speech characterisation models. The speech characterisation models can include at least one or more of: a universal background model (UBM), at least one speech GMM, at least one non-speech GMM. In an embodiment the speech characterisation models further include at least one set of non-speech JFA (joint factor analysis) hyperparameters, and one or more sets of speech JFA Hyperparameters each set of JFA Hyperparameters characterising an individual speaker.

The method can further comprise the step of identifying individual speakers within a recording based on the one or more sets of speech JFA Hyperparameters.

In some embodiments a recording is subdivided into a plurality of sections and the steps b) to m) are performed on each section of the recording, and before step n) the method further comprises the step of comparing modelled speaker contiguous segments between sections of the recording to identify sections segments apparently spoken by the same speaker for the whole recording.

An aspect comprises a method of developing models in an automatic diarisation system comprising a system controller, digital signal processor and memory, the method comprising the steps of:

a) retrieving one or more annotated audio recordings by the controller, each annotated audio recording comprising an audio file and associated annotation data identifying timing in the file for changes between speakers, changes from active speech to non-speech, and differentiation of individual speakers;

b) performing, using the digital signal processor, feature extraction on the plurality of recordings;

c) using the annotation data the controller accumulating a set of all non-speech features for each recording;

d) using the annotation data the controller forming a set comprising speech features for all speakers each recording;

e) developing a universal background model (UBM) for each recording using the set comprising speech features for all speakers for the recording; and f) storing the UBM for input to automated diarisation processing.

In an embodiment, in step b) the feature extraction is performed based on frames of samples, processed to extract speech feature components compatible for reliable modelling using Gaussian mixture modelling (GMM).

In an embodiment, in step e) the universal background model (UBM) is developed as an extensive Gaussian mixture model using an Expectation-Maximisation (EM) algorithm.

Some embodiments of the method further comprise the steps of:

g) performing speech Gaussian mixture modelling (GMM) for each recording using sampled data from the set comprising speech features for all speakers for the recording and storing the speech GMM for each recording; and h) performing GMM for each recording using sampled data from the set comprising all non-speech features for the recording and storing the non-speech GMM for each recording, wherein the speech GMMs, non-speech GMMs are stored for input to voice activity detection in a automated diarisation process.

This embodiment can further comprising the steps of:

i) using the annotation data the controller forming for each recording a plurality of sets of speech features for each speaker, each set representing speech features for a set short time duration l, and computing statistics for each set;

j) performing joint factor analysis (JFA) hyperparameter training for each speaker using the plurality of sets of speech features for the speaker, the computed statistics for the speaker and the UBM to determine characterising speaker JFA hyperparameters for the speaker, and storing the speaker JFA hyperparameters for each speaker;

k) computing statistics for non-speech features for each set of all non-speech features for each recording;

l) performing JFA hyperparameter training for non-speech using the set of all non-speech features for each recording, the computed statistics for the non-speech and the UBM to determine characterising non-speech JFA hyperparameters for non speech, and storing the non-speech JFA hyperparameters for each recording;

whereby the speech JFA Hyperparameters and non-speech JFA hyperparameters are input to speaker identification in an automated diarisation process.

In step i) the short duration l can be chosen as a length sufficient to exhibit linguistic variation over the length of the short duration and to divide a longer period of speech into short duration segments that can each be treated as a separate session. For example, the duration l is chosen from within the range of 5 to 20 seconds. In an embodiment, the segment length l is 10 seconds.

BRIEF DESCRIPTION OF THE DRAWINGS

FIG. 8a illustrates the outputs during steps of the evaluation process shown in FIG. 8.

DETAILED DESCRIPTION

Embodiments of the present invention provide methods and systems for performing automatic diarisation of sound recordings including speech from one more speakers. A particular application for embodiments of the invention is speaker diarisation for recordings of meetings, hearings, seminars, training courses, court proceedings, parliamentary debates etc. where typically the objective of the recording is to capture speech. It should be appreciated that in such environments, although the aspect of a sound recording of greatest interest is the speech, other noises will be present within the recording environment and be captured in the sound recording as background noise.

Figure 1:
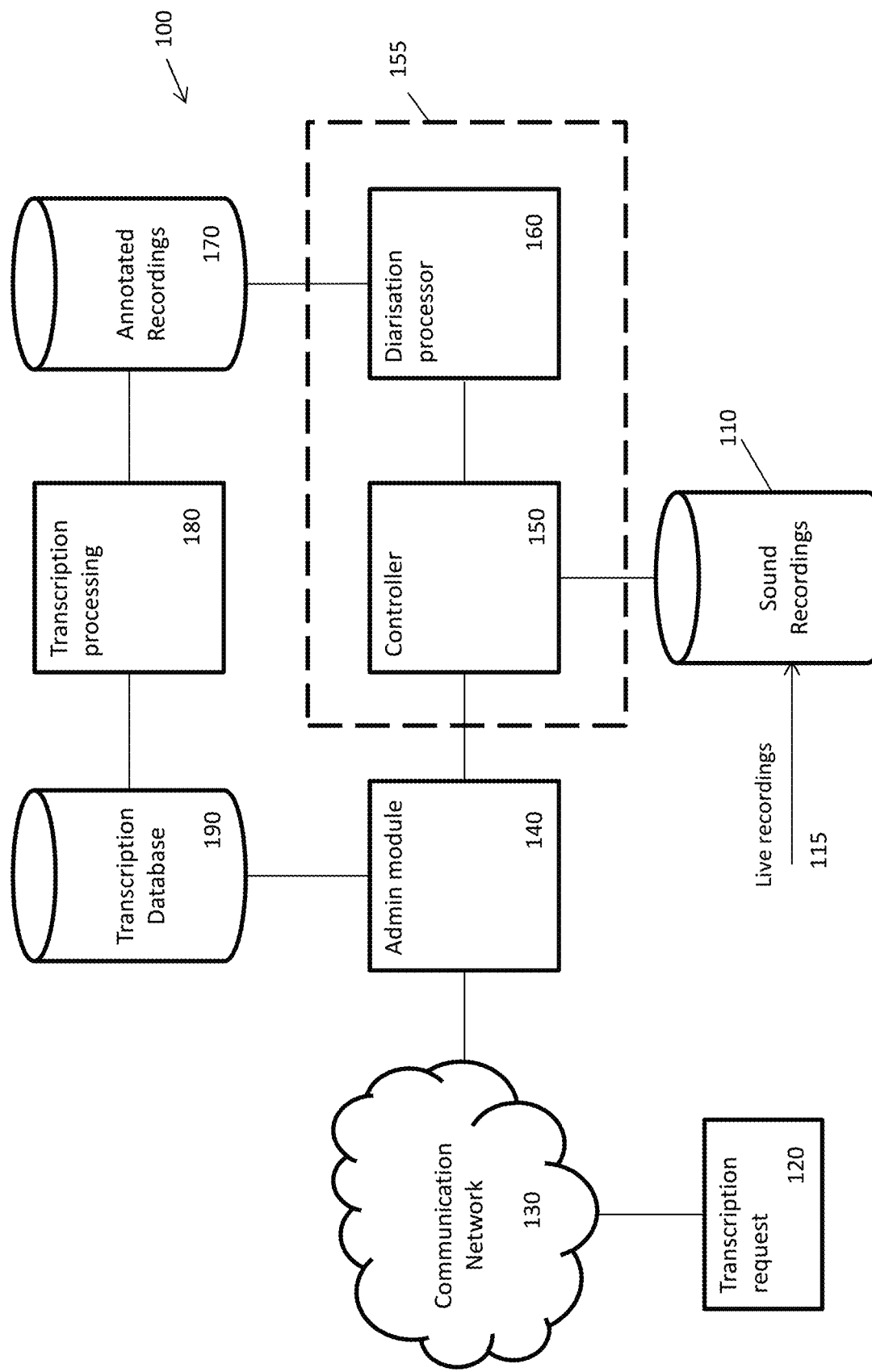
FIG. 1 is a high level block diagram of a system for providing transcriptions including an automatic diarisation system component.

Embodiments of the systems and methods will be discussed in the context of an application to automatic diarisation of courtroom recordings. It should be appreciated that written records of such proceedings are desirable. An embodiment of a system for providing transcriptions is illustrated in FIG. 1. This system 100 accesses a database of sound recordings 110 recorded live 115 from within a venue such as a court room. The database 110 stores an archive of recordings. The system is configured to automatically or semi-automatically generate text transcriptions of the sound recordings.

Generation of the transcript may be triggered by a user request. Transcriptions of court proceedings may be requested by users 120, for example via a web page or client application executing on a user device whereby the transcription request 120 is transmitted to the system 100 via a communication network 130. Alternatively a request may be made manually (for example by speaking with a librarian or administrator in person or via a telephone call) and forwarded to the system by an administrator via a user interface.

The system 100 comprises an administration module 140 configured to handle the requests, the administration module is configured to look up a database 190 of transcriptions and if a transcript already exists for the proceeding or session of a proceeding requested, then the stored transcript is returned. However, if a transcript does not exist, this can trigger a transcription generation process. The system 100 includes a diarisation system 155 configured to process sound recordings to identify, from within a sound recording, individual speakers and speaker changeover. The diarisation system 155 is configured to automatically annotate speaker changes within a sound recording. The annotated recording 170 can then be input to a transcription process 180 for conversion of speech to text, which can then be stored in a transaction database 190 for delivery to users in response to transcription requests.

For transcription processing 180 traditionally individuals are required to listen to the recordings and manually transcribe the recorded speech, providing annotated recording can greatly improve the efficiency of manual transcription processing. There are some transcription processing systems configured to perform automatic speech to text conversion. Speech to text processing is often error prone and requires manual proof reading and correction. Using annotated recordings as an input to such processing can greatly improve the quality of the speech to text processing. Traditionally recordings are manually annotated. In embodiments of the present invention sound recordings are processed by the diarisation system 155 and annotations for recordings automatically generated identifying the timing of speaker changes within the recording.

In the context of court proceeding, these are recorded live 115, typically using a plurality of microphones each providing one recording channel. Although some microphones may be targeted for an individual speaker or area of the room each will also pick up background noise and in some cases speech from other speakers than that targeted (also referred to as "spill over"), each microphone may also be used by a number of different speakers, for example a microphone set up in front of a jury or witness stand. There may also be instances where more than one speaker is speaking at once. Recordings can also be very long, for example several hours. In such environments it can be difficult to distinguish between individual speakers and present challenges for automating speaker detection and changes between speakers. The inventors have developed systems and methods to enable effective automatic diarisation for such environments.

The speaker diarisation module 155 comprises a controller 150 and a diarisation processor 160 configured to perform digital signal processing of sound recording data retrieved from the database 110. The diarisation processor 160 can be implemented using one or more digital signal processors and memory. In some embodiments the diarisation system 155 is implemented using distributed processing and memory resources assessed via a communication network, otherwise known as "cloud based" resources.

Figure 2:
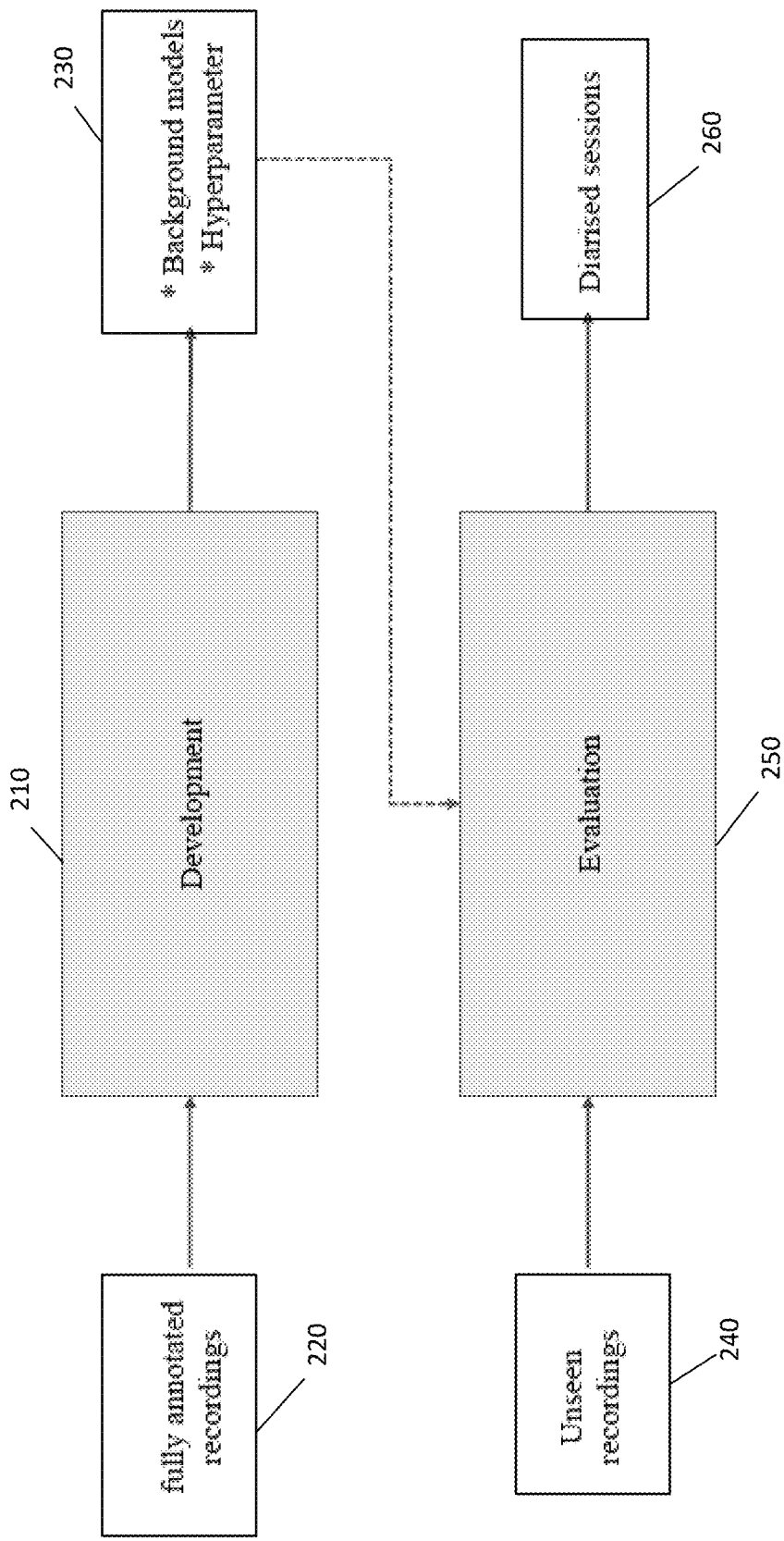
FIG. 2 illustrates the two distinct diarisation system phases of training and evaluation.

The automatic diarisation has two distinct phases (illustrated in FIG. 2) a development or training phase 210, and a utilisation or evaluation phase 250. The development or training phase 210 is used to generate models 230 from already annotated sound recordings 220. The models 230 can comprise sets of data characterising aspects of speech of the individual speakers and speaker environment. In an embodiment, during the development phase, the system employs a fully annotated set of recordings to learn the characteristics of speech, speakers and the environment in which this information is recorded. The output of this stage is a set of background models and hyperparameters that are then used to carry out the evaluation stage.

In the utilisation or evaluation phase 250, the generated models 230 are applied during processing of unseen (new, un-processed or un-annotated) recordings 240 to diarise and annotate the unseen recordings to produce diarised sessions 260. The diarised sessions can then be input to further processing, such as transcription. In an embodiment the evaluation phase involves the application of the speaker diarisation module to previously unseen recordings, using the developed background models and hyperparameters, to annotate the given recordings.

It should be appreciated that the development or training phase is used to generate data models and parameters utilised in the evaluation or utilisation phase. It may only be necessary to execute the training phase once. The generated models can then be applied in multiple evaluation phases for diarising a plurality of recordings. It is envisaged that a speaker diarisation module may be configured to perform the evaluation stage only, with the data models and parameters required for evaluation input to the diarisation module. For example, an embodiment of the system may be provided pre-loaded with background models and hyperparameters. For example, the training phase may have been executed by one diarisation system and the generated background models and hyperparameters loaded into system memory or a database for use by other diarisation systems. This may have an advantage of avoiding the training phase for some systems where appropriate models are already available and can be downloaded as system data.

Development/Training Phase

The development/training phase 210 is used to generate models from already annotated recordings to be applied by the system during the evaluation/utilisation phase 250 to model unseen data for diarisation. The goal of this stage is to characterise the behaviour of speech and its speakers for the environments and contexts for which the system will be applied to diarise new/unseen recordings. An objective of the development phase is to produce the trained models such that they are robust enough to model unseen data accurately. The models generated can include:
  a universal background model for all speech,
  a general speech model and general non-speech model suitable for voice activity detection application—to differentiate between speech and non-speech,
  individual speaker characterisation models for one or more speakers, and
  non-speech characterisation model.

Figure 3:
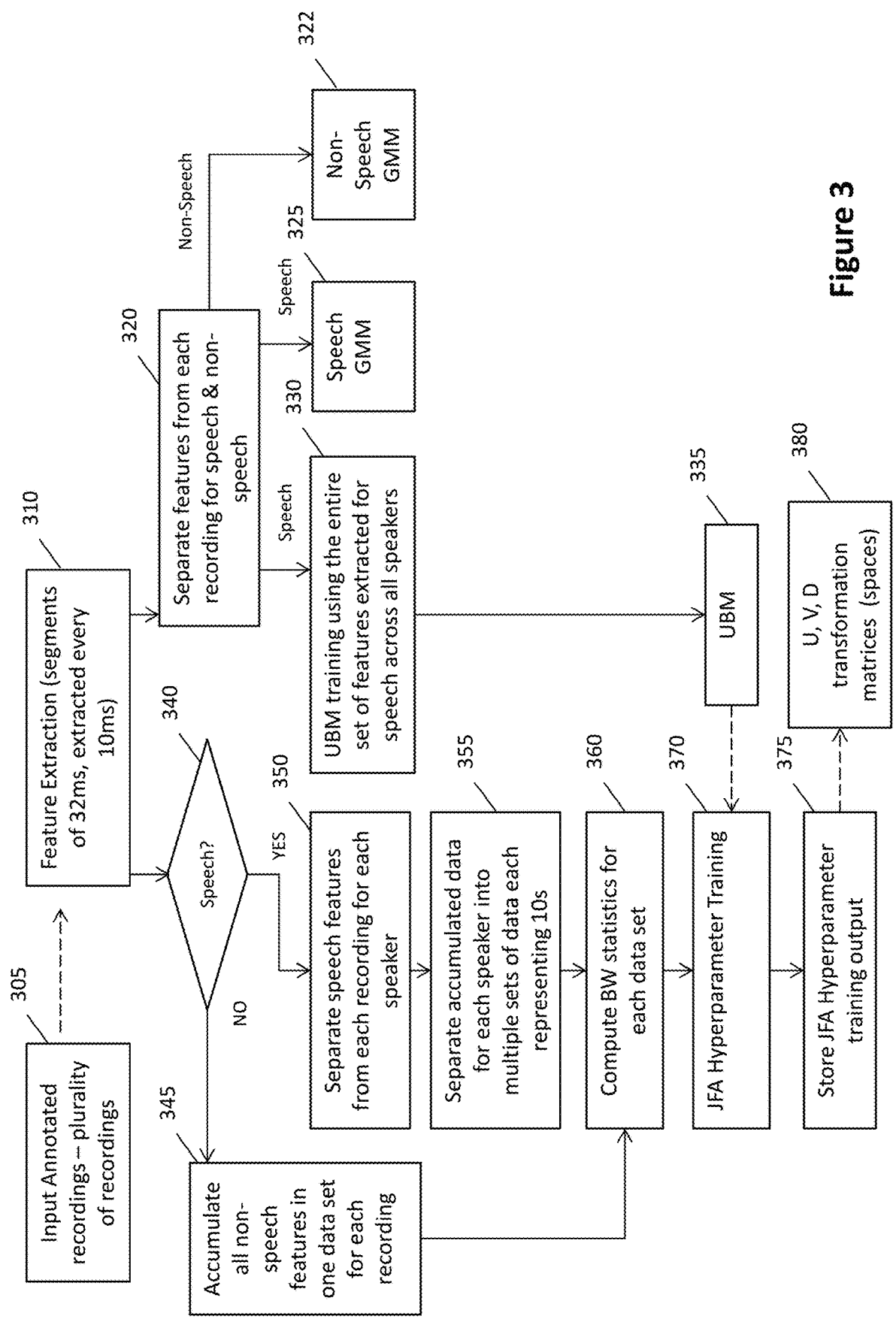
FIG. 3 is a flowchart of an example of a diarisation system training process.
Figure 4:
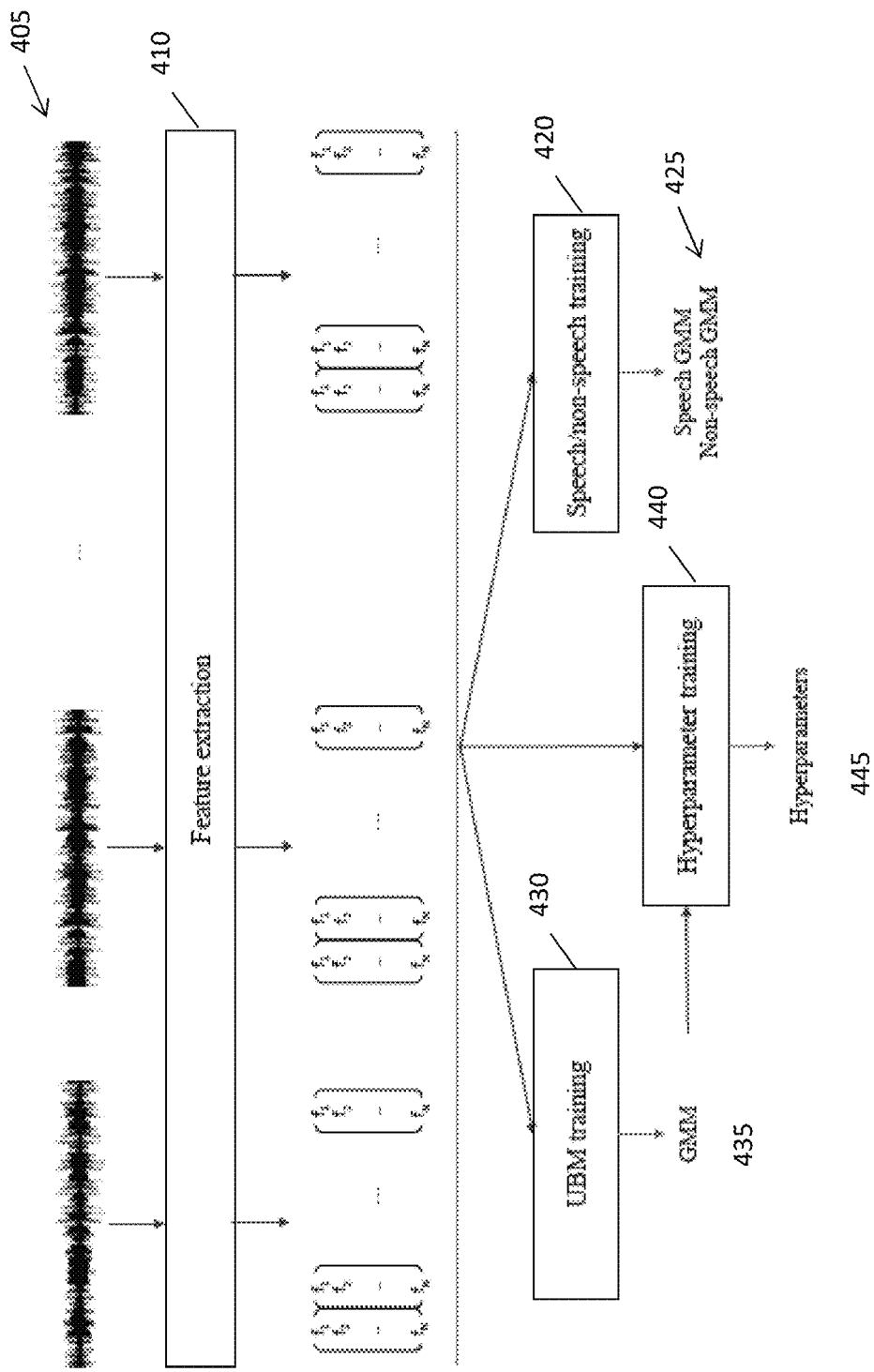
FIG. 4 illustrates the key training phase processes.

An example of the development phase will now be discussed in further detail with reference to FIGS. 3 and 4. In this embodiment the development phase trains background models and hyperparameters using annotated data. The background models in this embodiment include a universal background model, and Gaussian mixture models (GMM) for speech and non-speech for using in voice activity detection. Individual speakers and non-speech models are characterised using speaker and session hyperparameters.

The input to the training process is one or more annotated audio recordings 305. For example, the annotated recordings may have been manually annotated and the audio recordings and associated annotation data stored in a data base. The annotated recordings may comprise a audio file and an associated annotation file storing annotation data identifying timing in the file for changes between speakers, changes between active speech and non-speech, and differentiation of individual speakers. In an embodiment the annotation data may be stored as metadata embedded in the audio file. The diarisation system 155 may be configured to retrieve the annotated recordings from a database or system memory.

Initially, each recording is processed to extract typical speech processing features, referred to as the mel-frequency cepstral coefficients (MFCC) features. These features are then used to perform UBM training, hyperparameter training, and speech and non-speech training. In an example the utilities used to carry out the development phase include:
  SoX—Sound eXchange
  AVconv—Audio-video converter
  Python NumPy library
  Python SciPy library
  QUT Python Speech library
  QUT GenModel
  QUT SAIVT Library The first processing step of the input annotated recordings is feature extraction 310. This step extracts features that have components representative of speech which can be reliably modelled using Gaussian mixture modelling (GMM).

Feature extraction 410 is the process of transforming the speech samples 405 into a multidimensional feature space 415, so that the produced feature vectors provide the most significant amount of distinction among each speech class under consideration. This section will briefly review the Mel-frequency cepstral coefficients (MFCC) as acoustic features, which are used in this embodiment of the diarisation system. In this embodiment MFCC methodology is used, however alternative methodologies may also be applied provided the same methodologies used for system training are also applied during system utilisation/evaluation.

Initially a pre-emphasis function can be used to omit the effect of sudden changes of continuous speech signal. For example, in this example for pre-emphasis, Python's scipy.signal.I filter library is used with the coefficient value set at 0.97. The objective of this step is to moderate the impact of sudden changes. In some embodiments this step may not be necessary or and equivalent step been performed prior on the sound recording prior to access by the system, thus rendering a pre-emphasis step redundant.

Figures 5A, 5C:
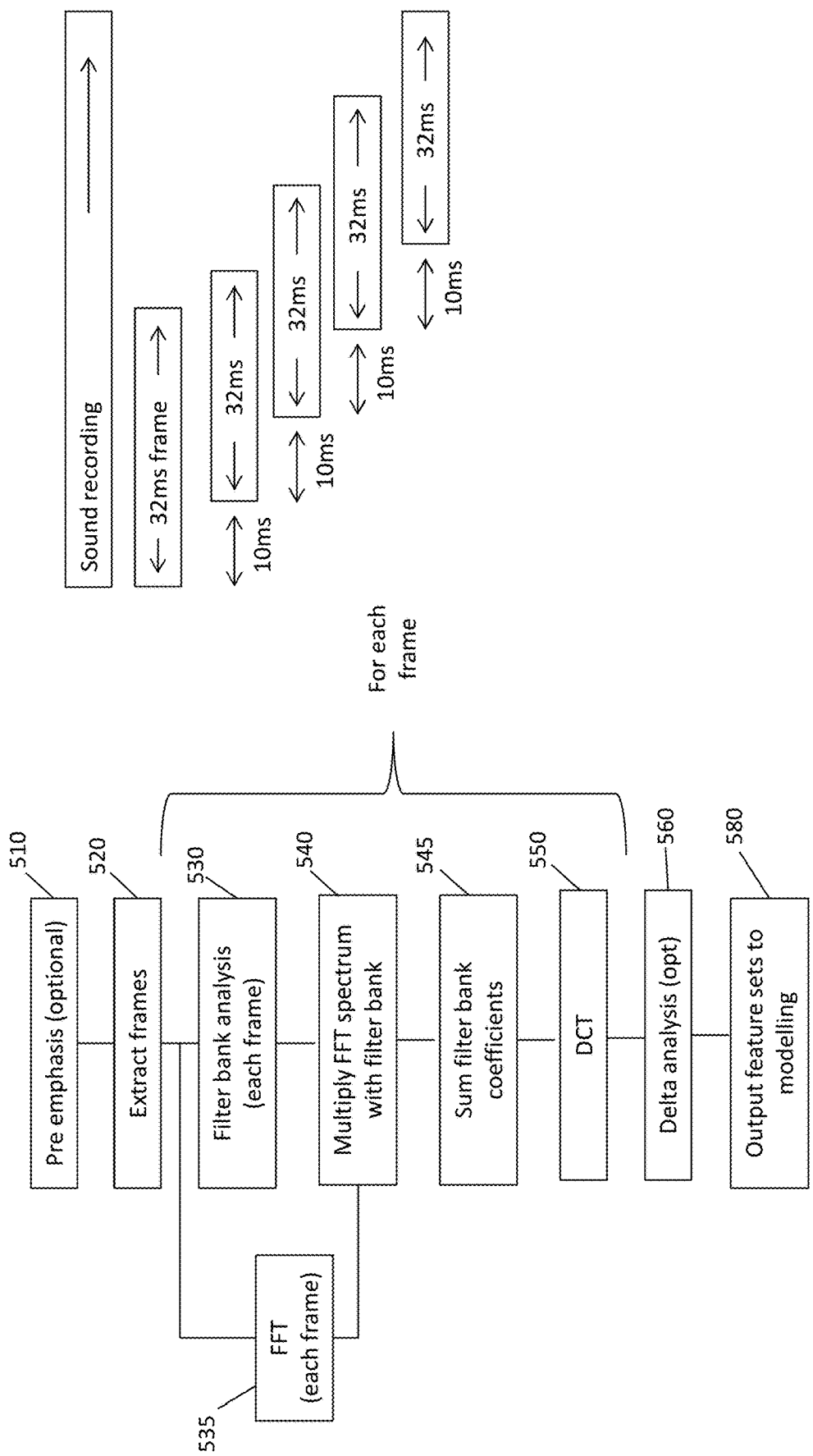
FIG. 5a is a flowchart of a feature extraction process.
FIG. 5c illustrates extraction of overlapping frames for feature extraction.
Figure 5B:
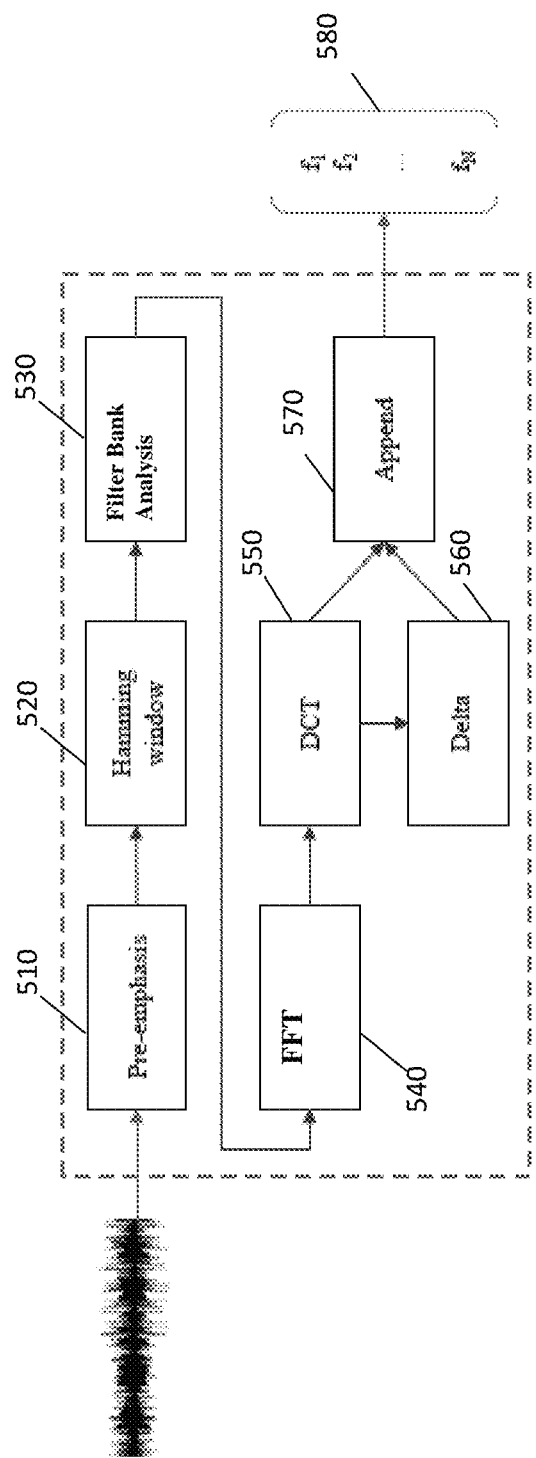
FIG. 5b is an alternative flowchart representation of the feature extraction process.

The first feature extraction step 520 is to extract frames for feature extraction processing from the sound recording. In the exemplary embodiment show in FIG. 5b, a plurality of overlapping frames are extracted from the original audio recording. In this embodiment a Hamming window function is applied on 32-millisecond windows every 10 millisecond. Original recordings are sampled at 8000 Hz. So each extracted 32-millisecond frame contains 256 samples and they have 22 milliseconds overlap with their neighbour frames. FIG. 5c illustrates the overlapping frames. In this embodiment the frame length is chosen as 32 milliseconds as it has been shown that speech is statistically unchanged over this duration. In this embodiment 32 millisecond frames and 10 ms intervals is chosen. This also provides a convenient frame sample size of 256 samples. Alternative window size and overlap are envisaged, for example window sizes of 20 to 40 milliseconds may be used and provide speech characteristics that are statistically unchanged over the duration. Extracting overlapping frames can improve resolution, for example 5 to 30 millisecond overlap may be used. Higher degree of overlapping between frames results in smaller variation in the changes between frames and thus improved resolution. The degree of overlap is based on frame length and shift between frames, for example a large overlap and small shift between frame extractions will result in a high degree of overlap and improved resolution compared with a longer shift relative to the frame length. The choice of window size may also be influenced by the sample rate of the original recording.

A windowing function (hamming window) is applied to the extracted frames to provide windowed frames, in which the impact of the Gibbs phenomenon is suppressed. The Gibbs phenomenon is a ringing effect observed at the edges of the samples frames. The windowing function reduces the impact of this effect.

Filter bank analysis 530 is then performed on each windowed frame. This analysis is based on non-linear frequency perception of a human's ear, which can be modelled by a triangular filter bank across the frequency spectrum according to the Mel scale which is defined by Equation 1.

$$Mel(f) = 2595 \log_{10}\left(1 + \frac{f}{700}\right) \quad \text{Equation [1]}$$

After calculating the filter bank, each windowed frame of the signal is transformed to the frequency domain, using fast Fourier transform (FFT) 535. Then each filter bank is multiplied by its corresponding FFT power spectrum 540. The resulting coefficients of each filter bank are summed 545 to produce accumulated amplitudes as N weighted sums for the N filters defined for the filter bank in accordance with Equation 2.

$$[m_i: 1 \leq i \leq N] \quad \text{Equation [2]}$$

At this stage, MFCC features can be extracted by getting discrete cosine transform (DCT) 550 of the log of those accumulated amplitudes, according to Equation 3.

$$c_i = \sqrt{\frac{2}{N}} \sum_{j=1}^{N} m_j \cos\left[\frac{(2j+1)i\pi}{2N}\right] \quad \text{Equation [3]}$$

The exemplary embodiment uses 20 filter banks (N=20) for this system, which yields to 20 MFCC features. Thus, the output of the DCT for each frame is a set comprising 20 MFCC feature elements $\{f_1, f_2, \ldots, f_N\}$ where (N=20). In the exemplary embodiment the number of filter banks is chosen as 20 matching the number of MFCC feature elements extracted. In alternative implementations the number of filter banks and MFCC features may be different. The number of filter banks may match or exceed the number of MFCC feature elements, but the number of filter banks cannot be less than the number of MFCC feature elements.

Once the MFCC features are calculated, in order to capture the dynamic characteristics of the acoustic signal, delta features can also be extracted and appended to the initial feature vector 560. Delta coefficients are calculated using the following equation, $$d_t = \frac{\sum_{n=1}^{T} n(c_{t+n} - c_{t-n})}{2 \sum_{n=1}^{T} n^2} \quad \text{Equation [4]}$$

20 delta features are extracted by considering 2 preceding and 2 following frames of each frame (T=2). As a result, a 40 dimensional feature vector for each frame is created by appending 20 delta features to 20 MFCC features for each frame 570, providing an output set for each frame 580 comprising 40 feature elements $\{f_1, f_2, \ldots, f_N\}$ where (N=40). It should be appreciated that identifying the delta processing is optional. However, utilising the delta processing can improve the accuracy of the generated models and automatic diarisation outcomes.

The number of frames utilised for extracting delta features may vary between embodiments. For example, T, the number of frames preceding and following may vary between embodiments. For 32 ms frames as utilised in the exemplary embodiment 2 to 5 frames may be utilised for delta processing ($2 \leq T \leq 5$). Note the number of preceding claims must be the same as the number of following frames, but the number of frames T may vary. The range of the number T of frames utilised for extracting delta features is based on the frame size and number of features extracted and so may vary between embodiments. For different frame lengths a different number of frames may be used for delta processing.

The extracted feature data and annotation data is an input to the model generation process described below, this is referred to as a development set. It should be appreciated that feature extraction methodology may vary for different embodiments of the system. However, most accurate automatic diarisation results will be achieved where the feature extraction methodology applied during training is the same as that applied during evaluation.

Using the annotation data the controller identifies the feature sets extracted for each frame as speech or non speech 320, 340 and these extracted features are input to different analysis processes, these processes can occur serially or in parallel. For speech frames 340, extracted feature elements can also be allocated a speaker identifier based on the annotation data, such that all features extracted for a speaker can be associated based on the speaker identifier 350. The annotated data can enable differentiation between features for each speaker including where speaker change occurs within a frame. Using the annotation data 340 the controller can also accumulate a set of all non-speech features for each recording 345. In some contexts recordings may typically include periods where a number of speakers or people within the recording space may speak at once without need (or sometimes ability) to distinguish any specific speech, this may be referred to as "crowd noise" or "babble". Such babble may be characterised as non speech in some recordings and annotated as babble in other recordings. If babble is independently annotated, then a babble model may be trained similarly to non-speech.

The system develops a background model for all speech in the environment. The set 320 comprising all speech features for all speakers for the recording is used to develop a universal background model (UBM) 330 and storing the UBM 335.

For voice activity determination and distinction between speech and non speech, lower resolution background models can be generated, one for speech and one for non speech. The set 320 comprising all speech features for all speakers for the recording can be sampled and used for performing speech Gaussisan mixture modelling (GMM) to provide a speech GMM model 325. Similarly, the set comprising all non-speech features can be sampled and GMM can also be performed to provide a non-speech GMM model for each recording 322.

For use in individual speaker identification, the system develops models for each speaker and for non-speech in the environment. In this processing the controller accumulates sets of extracted feature data for each speaker 350 and this can be accumulated into multiple sets of data 355, each set representing speech features for a set short time duration, and statistics can be computed for each set 360. The controller then performs joint factor analysis (JFA) hyperparameter training 370 for each speaker using the plurality of sets of speech features for the speaker, the computed statistics for the speaker and the UBM 335 to determine characterising speaker JFA hyperparameters for each speaker, and storing the speaker JFA hyperparameters for each speaker 375. For all non-speech features the system also generates a non-speech model. In the exemplary embodiment this is performed by computing statistics 360 for non-speech features 345, and performing JFA hyperparameter training 370 for non-speech using the set of all non-speech features 345, the computed statistics for the non-speech and the UBM 335 to determine characterising non-speech JFA hyperparameters for non speech, and storing the non-speech JFA hyperparameters 375. The processed for developing these models are discussed in further detail below.

Universal Background Model Training 330

In order to be able to model unseen data for the task of speaker diarisation, a universal background model (UBM) is needed to represent the complex distribution of similar data. The development data used to obtain this UBM is already annotated sound recording data for the context the automatic diarisation system is to be employed. In the exemplary embodiment the input to UBM training is the extracted feature data as described above. The UBM can be developed based on all active speech frames for the context. For example, using all of the extracted feature sets for all frames identified as speech frames from a court session recording.

The UBM in this embodiment refers to an extensive Gaussian mixture model (GMM) that is trained using the Expectation-Maximisation (EM) algorithm to model the distribution of the development data. This approach has been employed for modelling the distribution of speech features. The use of GMMs for modelling complex distributions has been a common mathematical approach in various fields.

In the exemplary embodiment, the UBM training is conducted using all active speech data for all speakers in the development set. The entire set of features from all unique speakers are used for UBM training. The UBM is trained as a large GMM with 512 mixture components.

Gaussian Mixture Modelling

GMMs are a method for modelling and are based on the theorem that a large number of measurements leads to a Gaussian distribution. GMMs model each class with a weighted sum of M Gaussian probability density functions, which is defined by Equation 5.

$$P(o|\omega_i) = \Sigma_{i=1}^{M} \omega_i b_i(o) \quad \text{Equation [5]}$$

where o is a D-dimensional feature vector, $b_i(o)$ is the Gaussian density function for mixture i and $w_i$ is the weight of mixture i. The sum of the weights should be equal to 1. Each Gaussian density function is a D-variate normal distribution function which is defined by Equation 6.

$$b_i(o) = N\left(o, \mu_i, \Sigma_i\right) = \frac{1}{(2\pi)^{\frac{D}{2}} |\Sigma_i|^{\frac{1}{2}}} \exp\left\{-\frac{1}{2}(o - \mu_i)' \Sigma_i^{-1} (o - \mu_i)\right\} \quad \text{Equation [6]}$$

where $\mu_i$ and $\Sigma_i$ are the mean vector and covariance matrix for Gaussian i respectively. As a result, a GMM can be represented as $\lambda = [\lambda_1, \lambda_2, \ldots, \lambda_M] = [\omega_1, \mu_1, \Sigma_1, \omega_2, \mu_2, \Sigma_2, \ldots, \omega_i, \mu_i, \Sigma_i]$ Training a GMM involves estimating the parameters of the model by fitting them on a set of training data. This process is done using maximum likelihood estimation. In this approach, the likelihood of a given set of GMM parameters producing a set of observation vectors O of size N ($O = o_1, o_2, \ldots, o_N$) drawn from one of the classes being modelled is given by, Equation 7.

$$Y(\lambda) = p(O|\lambda) = \Pi_{i=1}^{N} p(o_i|\lambda) \quad \text{Equation [7]}$$

Therefore, the optimal parameters, $\lambda'$ can be determined by, Equation 8.

$$\lambda' = \underset{\lambda}{\mathrm{argmax}} Y(\lambda | O) \quad \text{Equation [8]}$$

A single Gaussian's parameters can be calculated directly by examining the data. However, determining the parameters of a GMM with multiple Gaussians is usually performed by using expectation maximisation (EM) approach.

Figure 6:
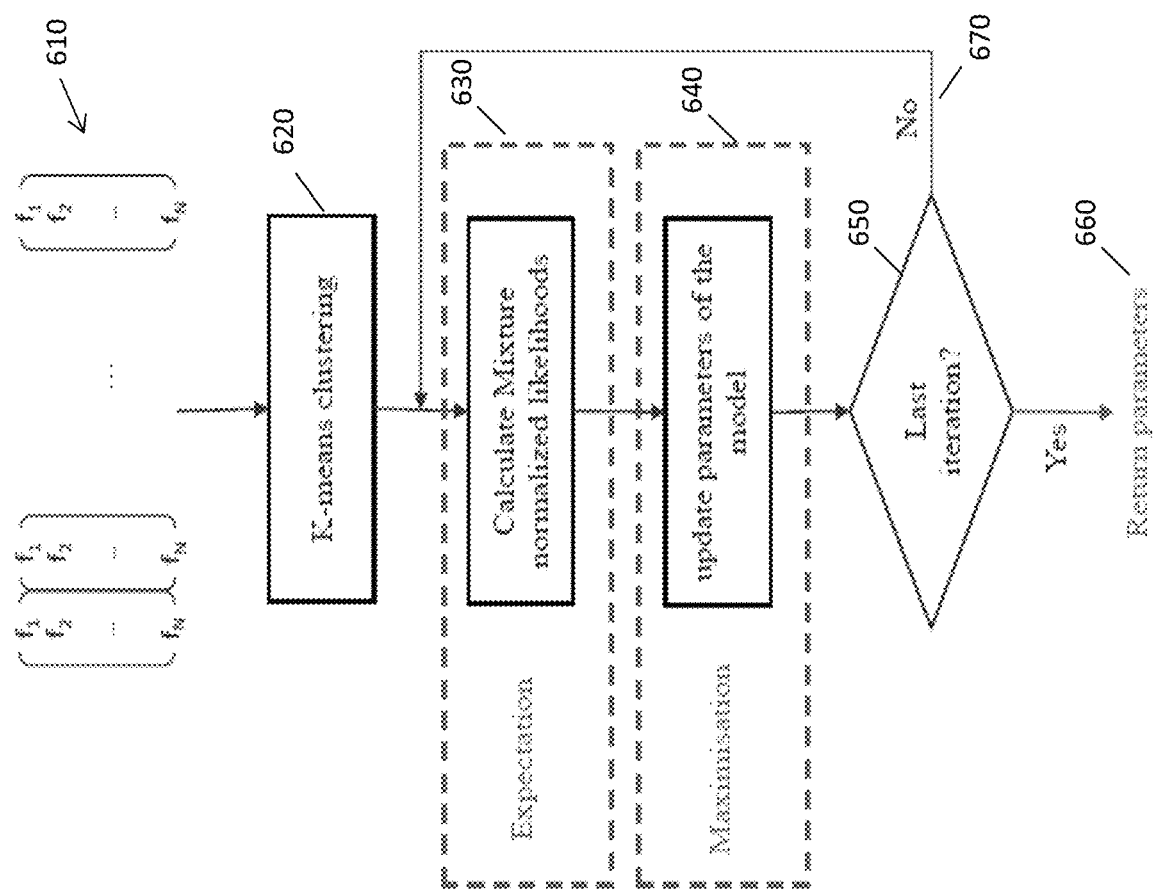
FIG. 6 is a flowchart of an example of a process for Gaussian mixture modelling (GMM) using expectation maximisation (EM).

EM is basically an iterative approach, which is used to improve the estimation of the parameter vector according to the likelihood of the observations being fitted by the parameter vector. For estimating GMM parameters, an EM algorithm is performed to train mixture i of the GMM according to the following steps, as illustrated in FIG. 6, using input extracted feature sets 610.

1. Initialisation 620: set $\lambda_i^{\{0\}}$ to initial value, set t=0.
2. Expectation 630: calculate $Y(\lambda_i^{\{t\}}|O)$.
3. Maximisation 640

$$\lambda_i^{\{t+1\}} = \underset{\lambda_i}{\mathrm{argmax}} Y(\lambda_i^{\{t\}} | O).$$

4. Iterate 670: t=t+1, repeat from step 2 until $Y(\lambda_i^{\{t\}}|O) - Y(\lambda_i^{\{t-1\}}|O) \leq$ Threshold or t=T.

Where $\lambda_i^{\{t\}}$ is the estimation of $\lambda_i$ at step t, Threshold is a pre-specified convergence threshold, and T is the maximum number of iterations permitted.

Usually, in order to achieve the best performance, initial parameters 620 of the GMM are set based on k-means clustering (an approach to find similar data and assign them to the same cluster) to choose M clusters from the training observations and initialise $\lambda_i^{\{0\}}$ based on one mixture for each cluster. K-means clustering was chosen for initialising GMMs in the exemplary embodiment of this system.

In the expectation step, the likelihood of the current parameter vector $\lambda_i^{\{t\}}$ fitting each observation in the training set is calculated based on a mixture-normalised likelihood.

$$l_i(n) = \frac{\omega_i b_i(o_n)}{\sum_{k=1}^{M} \omega_k b_k(o_n)} \quad \text{where} \quad \text{Equation [9]}$$

$$v(\lambda_i | O) \approx \prod_{n=1}^{N} l_i(n) \quad \text{Equation [10]}$$

The maximisation step uses the calculated likelihoods and recalculates the parameters to determine the likelihood that observation on is covered by mixture i using the previous choice of parameters. For a single mixture, GMM parameters are calculated as, $$\hat{\mu}_i = \frac{\sum_{n=1}^{N} l_i(n)o_n}{\sum_{n=1}^{N} l_i(n)} \quad \text{Equation [11]}$$

$$\hat{\Sigma}_i = \frac{\sum_{n=1}^{N} l_i(n)(o_n - \hat{\mu}_i)(o_n - \hat{\mu}_i)\prime}{\sum_{n=1}^{N} l_i(n)} \quad \text{Equation [12]}$$

$$\hat{\omega}_i = \frac{1}{N}\sum_{n=1}^{N} l_i(n) \quad \text{Equation [13]}$$

Finally, the iterative step checks whether end criteria are met. In this instance, if the number of iterations has reached a pre-specified number or parameters are converged to stop the algorithm. In an embodiment of the system, 50 iterations of training is performed wherever GMM training is done.

The above GMM training process is utilised for training the UBM using all the active speech frames 330. The same GMM training process can also be used for generating the lower resolution speech 325 and non-speech GMM 322 models using sampled speech feature sets and samples non-speech feature sets respectively.

Hyperparameter Training 370

For distinction between individual speakers (and also non-speech) and speaker identification, individual speaker data is used to model individual speaker characteristics. In the exemplary embodiment this is performed by hyperparameter training. The hyperparameter training stage consists of training speaker and session sub-spaces that are relevant to the environment in which the system is to be used for diarising new recordings.

The hyperparameter training is carried out based on a factor analysis modelling approach, which has been applied to the problem of independent speaker and session modelling based on an Eigen voices approach. The approach employed for embodiments of the present system uses a joint factor analysis (JFA) speaker modelling technique to independently model speaker and session information in the data. The output hyperparameters define a transformation matrix for each speaker, and a non-speech transformation matrix. The transformation matrices characterise the individual speakers and are applied during diarisation of unannotated recordings to determine the likelihood of speakers in the unannotated recording matching the modelled speakers.

The JFA hyperparameters necessary for achieving this model are obtained using the previously trained UBM and a coupled EM algorithm. The factor analysis model is specified by $\lambda$, a set of five hyperparameters of the form, $$\lambda = (m, U, V, D, \Sigma) \quad \text{Equation [14]}$$

where, m is the UBM mean supervector of dimension $CF \times 1$ (with C being the number of mixture components in the UBM and F the dimension of the feature vectors), U is the transformation matrix from the channel subspace to the UBM space of dimensions $CF \times R_c$ with $R_c$ being the channel rank, V is the speaker subspace transformation matrix of dimensions $CF \times R_s$ with $R_s$ being the speaker rank, D is a $CF \times CF$ diagonal matrix and $\Sigma$ is a $CF \times CF$ diagonal covariance matrix.

To estimate the hyperparameters, an offline training process is employed. m and $\Sigma$ are obtained directly from the background model represented by UBM. In the full JFA model Dz(s) is used to model the residual variability that is not captured by the speaker subspace, where D is the diagonal relevance MAP loading ma-trix and can be estimated using an empirical method, which states that D must satisfy the following constraint:

$$I = \tau D^T \Sigma^{-1} D \quad \text{Equation [15]}$$

where I is the identity matrix, $\tau$ is the relevance factor and $\Sigma$ is a diagonal matrix of the components' covariance matrices $\Sigma_c$.

The speaker and session subspaces are then estimated using a coupled expectation-maximization (EM) algorithm based on the UBM supervector space. A 300-dimensional session subspace ($R_c=300$) and 200-dimensional speaker subspace ($R_s=200$) were trained in this manner.

JFA hyperparameter training is typically carried out using a large number of speakers, with a large number of recording sessions available for each speaker. However, the nature and volume of the development data for some environments envisaged for application of embodiments of this system does not provide enough varying recording sessions for each development speaker. For example, for court session recordings these are typically long. Therefore most of the speakers tend to have one or two sessions with long recording lengths. Hence, in order to compensate for the minimal number of recording sessions, each speaker's recorded speech is split into many segments of length 10 seconds.

Each segment is then treated as an independent recording session. It should be noted that this segmentation is only required for hyperparameter training. For the other training and evaluation steps the original recordings are utilised.

Due to the short length of the partitioned segments or sessions, it is hypothesised that the information between any two segments for a speaker would differ significantly. This will mainly be due to linguistic variations between different segments of speaker sessions and will ensure that the trained session subspace represents within-speaker variations that arise from varying linguistic content in these segments of speaker sessions. It is important to note that all data from all speakers is split into sessions of length 10 seconds, labelled accordingly and used for training, thus simulating multiple session development data.

It should be appreciated that the length of the segment may vary between embodiments of the invention, for example 5 to 20 second length segments may be used. In the exemplary embodiment 10 seconds is chosen as a long enough period to exhibit distinguishable speaker characteristics and short enough to exhibit a linguistic variation between segments to enable each to operate as a separate recording session for the JFA hyperparameter training.

The data representing a 10 second segment for a speaker comprises an accumulation of extracted feature sets (i.e. extracted from overlapping 32 ms frames as described above) for the speaker, representing 10 seconds of speech by the speaker. In the exemplary embodiment the feature extraction is performed for the whole recording and then extracted feature sets accumulated for each speaker to represent the required speech length. This has the advantage of the output of feature extraction being suitable for each of the UBM training JFA hyper parameter training and speech and non speech GMM modelling. However, in an alternative embodiment a recording may be subdivided into short sessions for each speaker prior to feature extraction. In such an embodiment a separate feature extraction step will also be required for the input to UBM modelling. This may have a disadvantage in requiring additional pre-processing of the recording to separate and splice sections by speaker, but the modelling outcomes after feature extraction will be equivalent.

Figure 7:
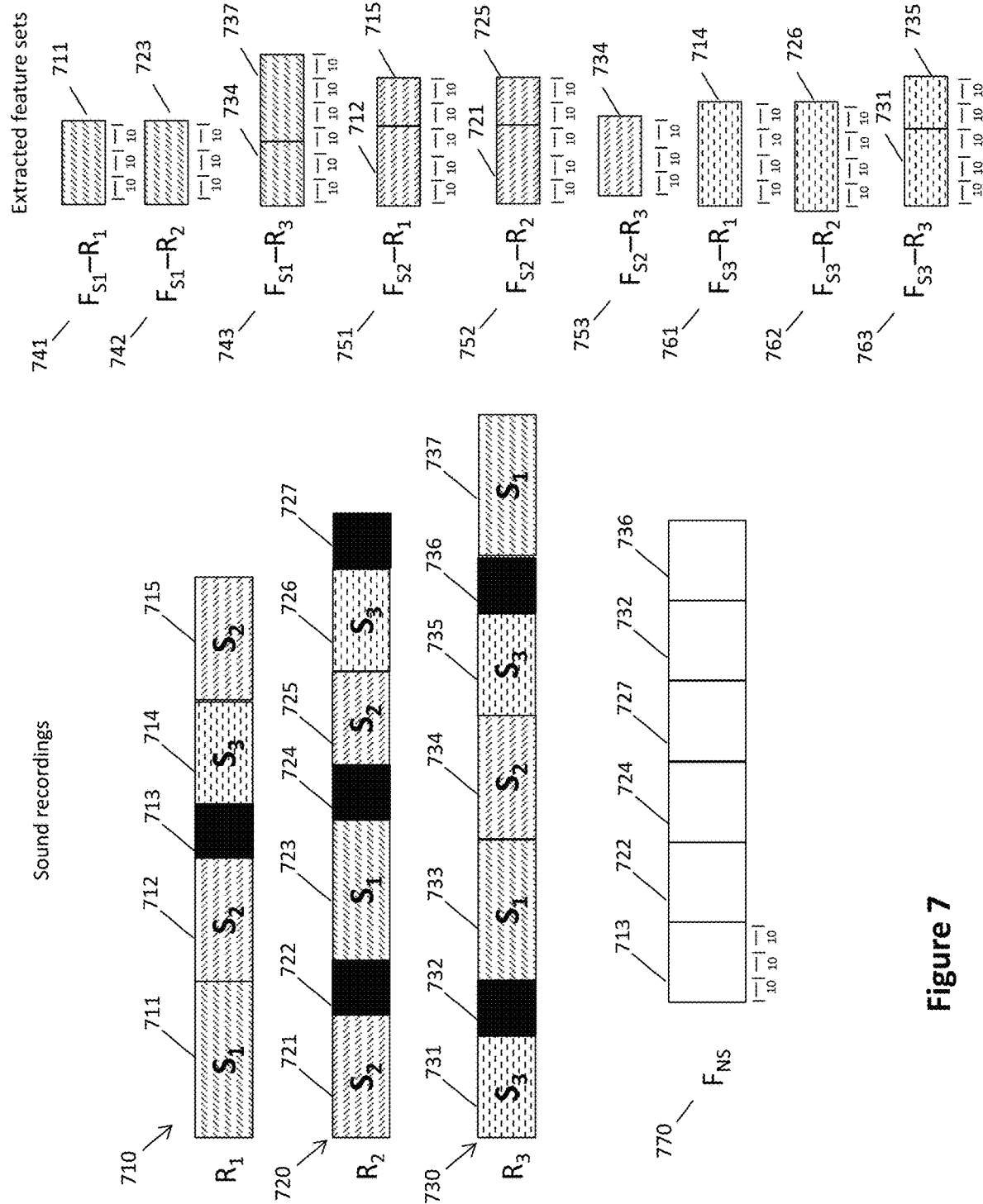
FIG. 7 illustrates segmentation of annotated recordings based on identified speakers and non speech and construction of extracted feature sets for each individual and non-speech for JFA modelling of individual speakers and non-speech during diarisation system training.

An example of session segmentation for training purposes is illustrated in FIG. 7, in this example, three sound recordings R1 710, R2 720 and R3 730, include speech from three speakers, S1, S2 and S3, and non speech. For example, the three recording sessions may be three different sessions of court proceedings in one court room, thus modelling the environment for the court room as well as the three speakers within this environment.

In this example the recordings R1, R2, R3 are divided into 10 second segments for each speaker after feature extraction is performed. For example recording R1 710 includes one period of speech by speaker S1 711, two periods of speech by speaker S2 712, 715, one period of speech by speaker S3 714 and one period of non speech 713. After feature extraction the sets of features for the speech by each of the individual speakers are accumulated into sets each representing 10 seconds of speech by the speaker. For example, for speaker S1, for the first recording $F_{S1}$-R1 741 the extracted features 711' for the speaker 1 speech period 711 are divided into a plurality of sets each representing 10 s of speech. The second recording R2 720 also has only one period of speech by speaker 1 723, and the corresponding extracted features 723' are split into a plurality of sets of extracted features $F_{S1}$-R2 742 each set representing 10 seconds of speech. In recording 3 730 speaker 1 has two periods of speech 733 & 737, so the extracted features for these two periods of speech 733' & 737' are accumulated and then separated into a plurality of feature sets $F_{S1}$-R3 743 each representing 10 seconds of speech. The plurality of sets are each treated as a features of separate recording session for the JFA analysis. This enables the JFA hyperparameter training to characterise linguistic variation for speaker 1 from within a recording and also between different recordings, for example from different session proceedings. Similar accumulation and segmenting of extracted features for each recording is also performed for speaker 2 and speaker 3. The non speech features $F_{NS}$ 770 are accumulated for all the non speech periods 713, 722, 724, 727, 732, 736 in all the recording sessions. The accumulated extracted features 713', 722', 724', 727', 732', 736' are divided into a plurality of sets, each representing 10 seconds of non speech. Thus, JFA training using the non-speech features sets $F_{NS}$ 770 characterises non speech within the environment, for example the courtroom. It is anticipated that non-speech characteristics for an environment will vary less between recordings than speech, for example non speech characteristics may be background noises such as traffic, air conditioning, feet or paper shuffling etc. Such sounds can be typical of the environment and will be captured in recordings, and feature extraction will extract feature of such sounds. The JFA processing for the non-speech features $F_{NS}$ will output a set of hyperparameters characterising such background noise. By modelling the non-speech noise typical of an environment the diarisation system can utilise the non-speech model to distinguish non-speech background noise similarly to an individual speaker model, to thereby reduce the likelihood of background noise being misidentified as speech and improve speaker detection accuracy.

Speech and Non-Speech Training

Speech 325 and non-speech 322 background models are trained to allow for accurate voice activity detection in the evaluation phase of the speaker diarisation system. This is done through GMM training (as explained above) for speech and non-speech data, in a similar manner as training the UBM. However, for voice activity detection a lower resolution model is used. To generate the lower resolution speech and non-speech models, the speaker data that was originally extracted for UBM training is concatenated and sampled (every 20th sample is selected) to train a 32 component GMM. For non-speech, the sections annotated as non-speech within the development recordings are selected and concatenated. This data is sampled every 20 samples and modelled using a 32 component GMM. To then identify a segment of audio as speech or non-speech, a log-likelihood ratio based measure can be applied, where if the likelihood of a given segment of data against the speech model is higher than that of the non-speech model the segment is labelled as speech, otherwise it is marked as non-speech. It should be appreciated that the speech and non speech model provides a lower resolution model that the UBM, thus the speech and non speech GMM models can be utilised to distinguish speech and non-speech. And thus provide a first parse of extracted features to distinguish between speech and non-speech before input to more computationally intensive frame processing to distinguish between individual speakers.

Embodiments of the present system are particularly suitable for diarisation of relatively lengthy recording in contexts such as court rooms, meetings, board rooms for parliamentary sittings. For embodiments of the present system the quality of the diarisation output can be improved by training the system using annotated recordings from the contexts/environments where the new unseen recordings are to be provided. In particular, by distinguishing between speech and non speech, then by considering individual speaker characterisation as the system can automatically identify speaker changes. The system may also be able to identify the individual speakers where the system has been trained using recordings form the individual speakers.

It is envisaged that a set of models can be trained in the diarisation system for a particular environment (or context) using annotated recordings made within that environment, for example a particular court room. For example a plurality of annotated recordings for a court room may be input to the training process, the recordings may be from a plurality of different sessions (different days, different subject matter) and include multiple different individual speakers. It should be appreciated that some aspects of the recording environment will be common across multiple recordings and even across individual speakers, such as environmental noise or artefacts of the sound recording system in the room, background noises, style of speech in the environment etc. By training models using multiple recordings from the one environment the general characteristics of the environment (background noise etc.) will be accommodated in the models and therefore enable more accurate distinguishing between speakers and other noise, and less diarisation errors. For example, diarisation errors can include:

Classification of non-speech or background noise as speech;
Classification of speech as non-speech;
Misidentification of speaker changes, i.e. identifying a speaker change within a monologue, or failure to identify a speaker change; and
Misidentifying speakers.

By improving the quality of the original models such errors can be minimised during unseen recording diarisation.

Once the system has been trained to develop models or models have been loaded into the system, the system can be applied to analyse and diarise new recordings.

Evaluation or Utilisation Phase

In the evaluation phase the system automatically diarises previously unseen sound recordings to automatically identify speaker changes within the recording and different speakers within the sound recording. The evaluation/utilisation phase utilises the models generated in the development/training phase. The evaluation phase performs processing specific to identifying when speakers change and identifying segments from the same speakers. The system may also be capable of recognising individual speakers based on the modelled speaker data.

The evaluation stage of the system consists of the speaker diarisation module used to process and annotate previously unseen recordings and speaker identities. A speaker diarisation system provides information regarding the speaker change times within a recording and the number of unique speakers within that recording.

Figure 8A:
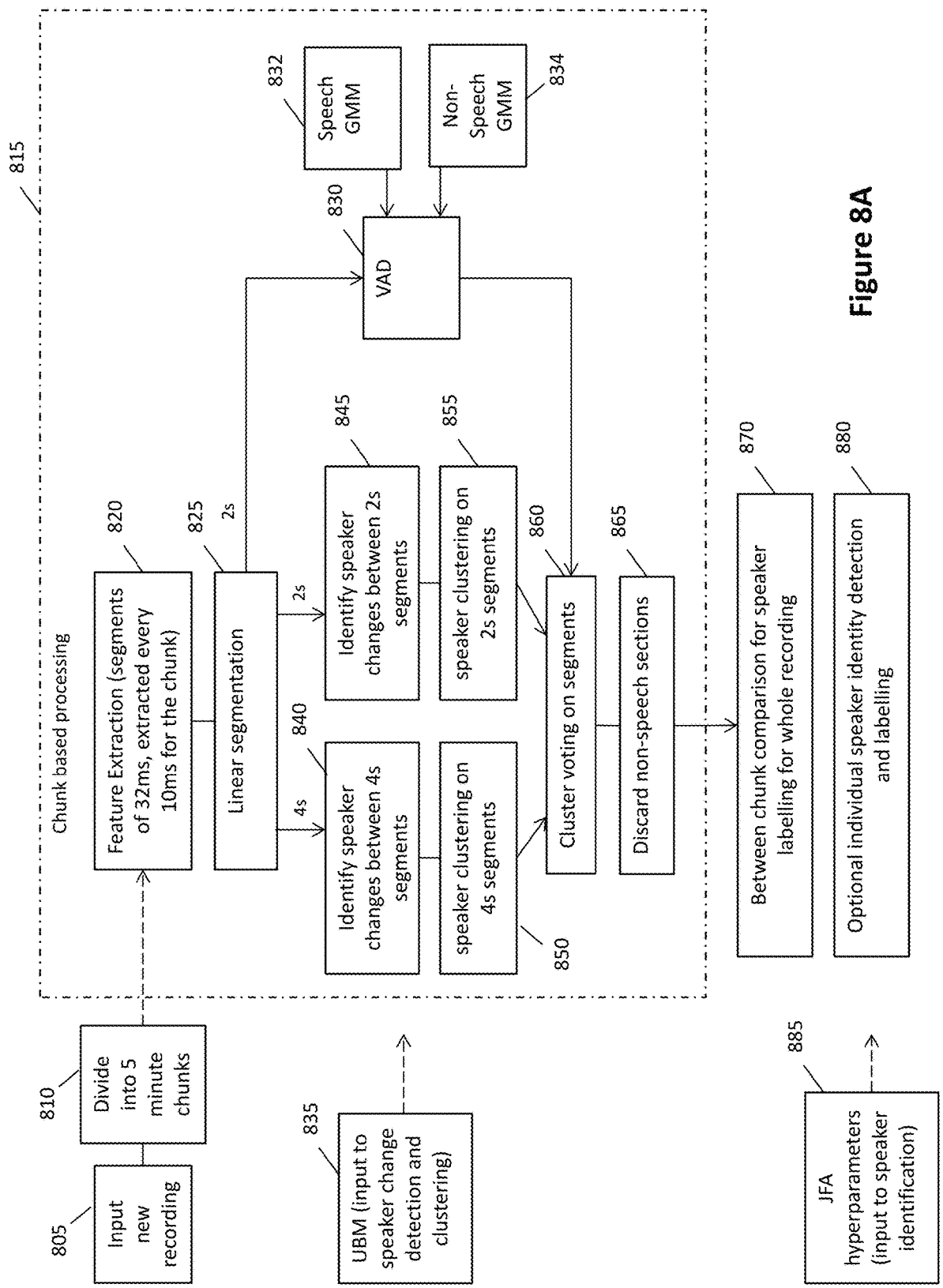
FIG. 8A is a flowchart of an example of evaluation phase processing for diarising an un-annotated recording.

An embodiment of the diarisation method is illustrated in FIG. 8A. In this method the system accesses an unseen (un-diarised) recording 805, for example a recording input to the system or retrieved from memory. For long recordings some embodiments divide the original recording into a plurality of section or "chunks" 810 to enable more efficient and potentially parallel processing of multiple chunks 810a, 810b . . . 810n. For example, in an embodiment a recording is divided into 5 minute sections or "chunks". The chunk length may vary between embodiments of the invention. Initial processing can be performed chunk by chunk 815, and the chunk-based processing can be performed in parallel, for example using cloud based processing and memory resources, to reduce required processing time for the diarisation process.

Speaker diarisation can be a computationally expensive task for long recordings. For this reason, an embodiment of the diarisation module is designed to provide computational efficiency through parallelisation of the diarisation task. To process a given recording, the diarisation system first splits the recording into smaller chunks 810a-n and then processes these chunks in a parallel manner. In the speaker diarisation process 815, each chunk is processed to identify and annotate the speakers within that segment, for example in FIG. 8B speakers 815a and 815b are identified in chunk 810a, speakers 815c and 815d in chunk 810b, and speakers 815e and 815f in chunk 810n. The unique speakers that are identified in each chunk 810a-n are then linked between chunks 870 to identify unique speakers across the entire recording 880. Illustrated in FIG. 8B, speaker 815a in chunk 810a is linked to speaker 815c in chunk 810b, indicating that speakers 815a and 815c are the same speaker 870a, similarly speakers 815b and 815f are linked as the same speaker 870b, and speaker 815d kinked with 815e as the same speaker 870c. Thus, the whole recording 880 can be attributed to three unique speakers 880a, 880b, and 880c. The unique speakers/clusters (from within a recording session) can then be assessed to determine whether they resemble speech or non-speech data. The non-speech segments can be discarded, and the recording's annotations are updated.

The utilities used to carry out the evaluation stage of the system include:
Python NumPy library
Python SciPy library
QUT Python Speech library The speaker diarisation system is designed to efficiently process long recordings by splitting them into smaller chunks and then processing these chunks in parallel. In the exemplary embodiment, the current length of a chunk has been set to approximately 5 minutes. This length is based on a standard length of TRM format files as used in an embodiment of the system. Due to the operating nature of this stage of the system, it will be referred to as "within-chunk" diarisation in the following sections.

As the within-chunk diarisation is done on each audio chunk independently, the process can be performed in parallel across different machines and across different CPUs of the same machine. In an embodiment the system creates a list of within-chunk diarisation tasks and utilizes Amazon cloud services to assign these tasks to different machines on Amazon web servers. This feature of system speeds up the diarisation of whole-day recordings and can save a large amount of time by running a lot of tasks simultaneously across many machines available on the cloud.

The within-chunk processing 815 begins with feature extraction 820. Feature extraction is performed 820 using the same methodology as for the training phase, for example as described above extracting features for 32 millisecond partially overlapping frames. The feature extraction needs to be compatible to the feature extraction used for training the models used during evaluation. Preferably the feature extraction for evaluation uses the same process as feature extraction in the training phase.

The extracted features are then used to form two separate sets 825, a first feature set comprising a plurality of first feature segment elements each element comprising the features of a sequential recording segment having a first length, and a second feature set comprising a plurality of second feature segment elements each element comprising the features of a sequential recording segment having a second length. This is also referred to as linear segmentation 825. In an embodiment the second length is an integer multiple of the first length, so each second feature segment element overlaps two or more first feature segment elements. In an embodiment the two lengths are 2 second and 4 second lengths, these could also be 3 s and 6 s, or 1 s and 3 s, etc. The two lengths do not need to be integer multiples, for example the lengths could be 3 s and 5 s, 3 s and 7 s. The segment lengths are chosen to be long enough to give enough data from a speaker for characterisation, and not too long that they would be corrupted by too much data from other speakers or sources of audio.

In the exemplary embodiment a given chunk is split linearly into equal sized segments, using two different segment sizes. In this embodiment the sizes used are segments of length 2 and 4 seconds. This means that the 5-minute recording is first split into K2 segments, where Kn is the number of segments in a chunk when segments of length n seconds are used (for a l=5 minute chunk $$Kn = \frac{l \times 60}{n}$$

segments). Similarly, the recording is then divided into K4 segments, each of length 4 seconds. These lengths are chosen to be short enough to be pure with respect to speaker identity, and long enough to be modelled accurately.

Speaker Change Detection

Figure 9:
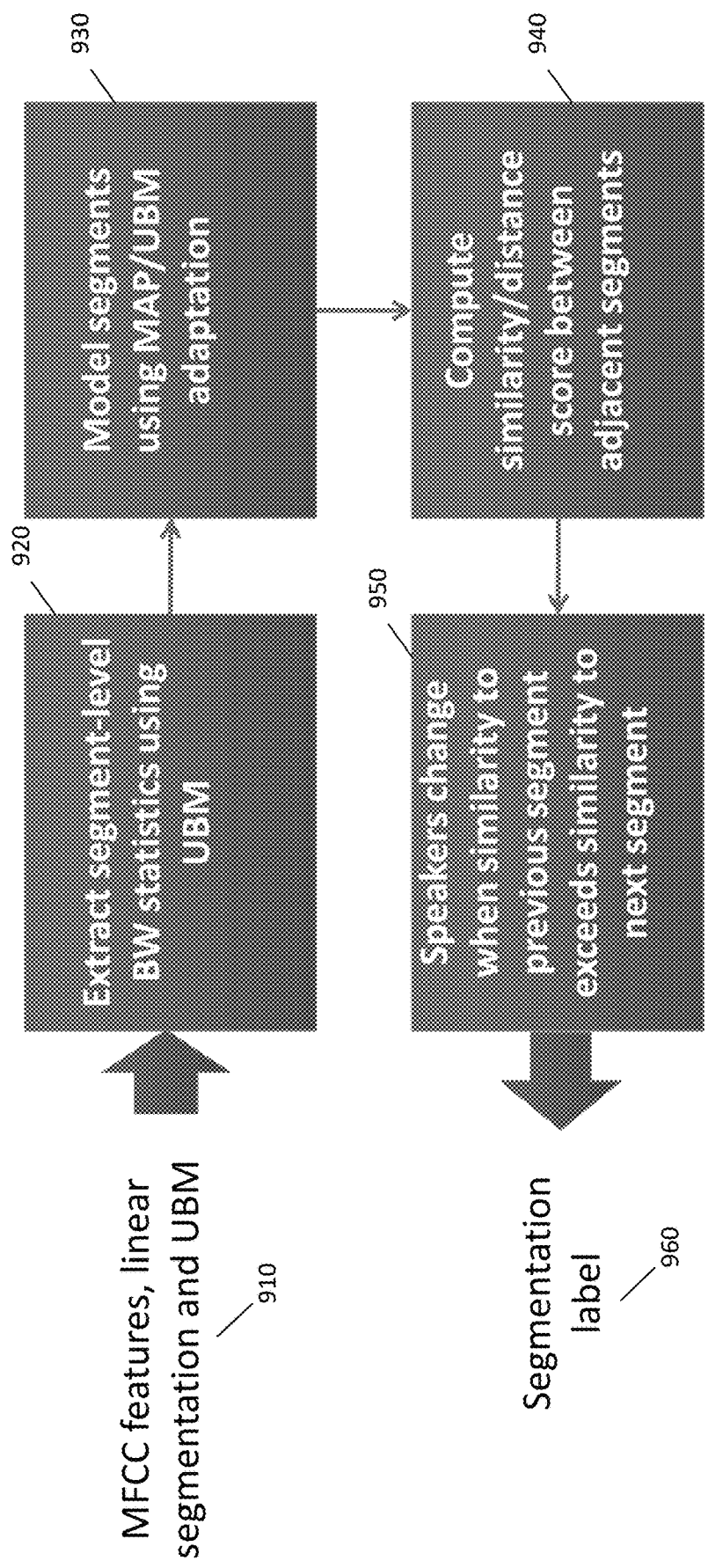
FIG. 9 is a flowchart of speaker change detection processing.
Figure 10:
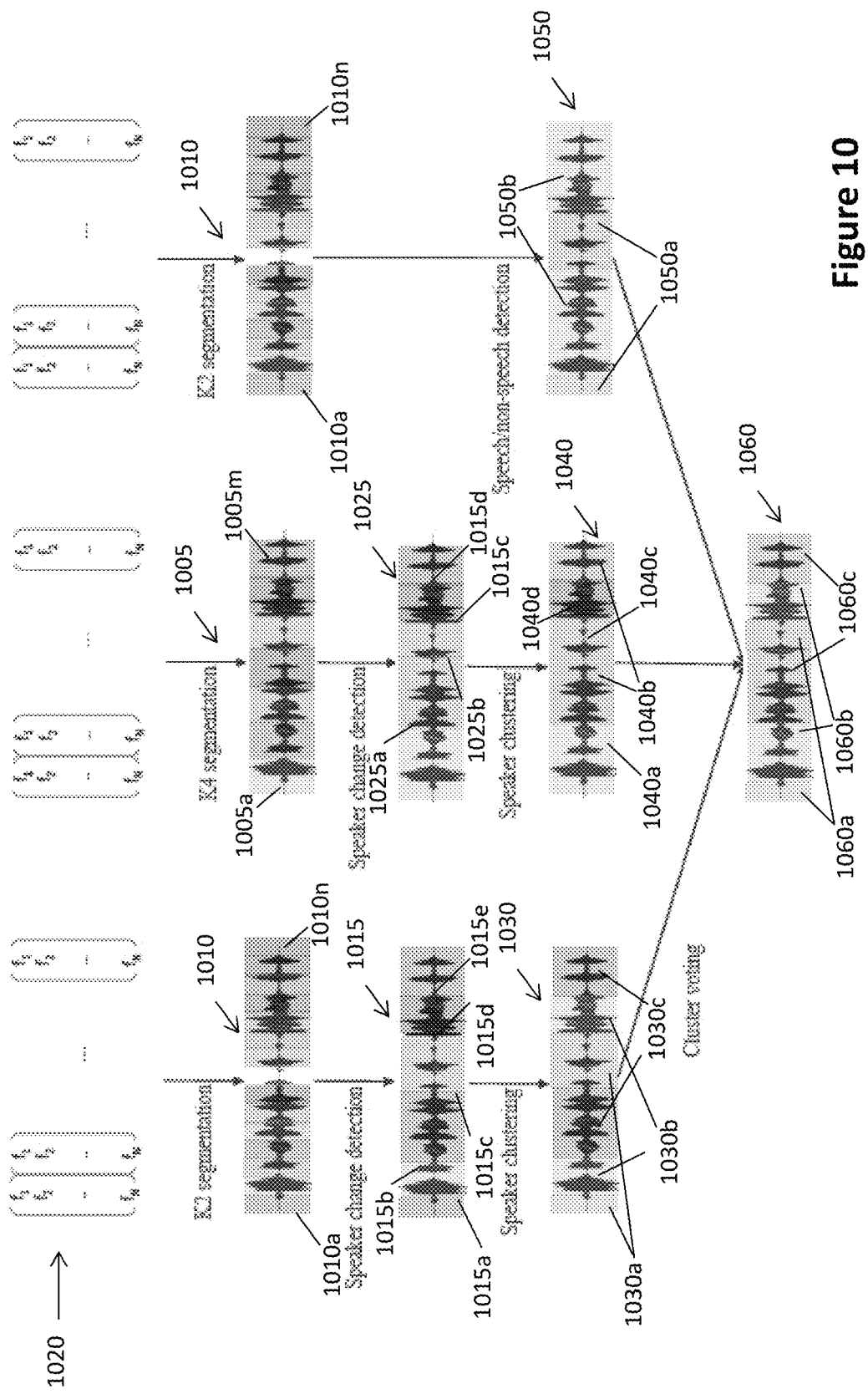
FIG. 10 illustrates the outcomes of key steps of within chunk evaluation processing.
Figure 11:
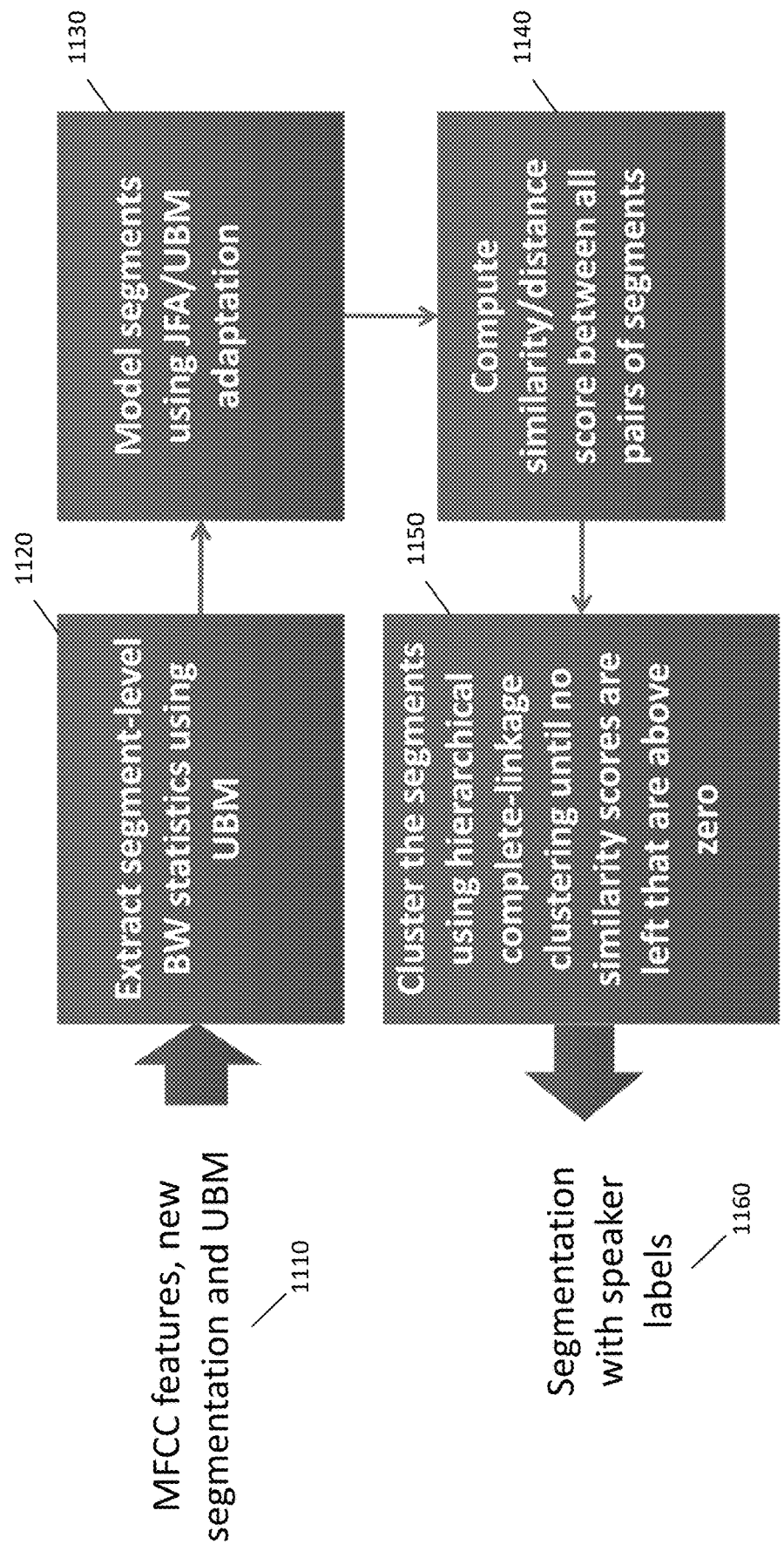
FIG. 11 is a flowchart of an example of a within chunk speaker clustering process.

In each of the two linear segmentation scenarios (K2 and K4), the UBM trained in the development phase is used to carry out a speaker change detection process 840, 845. This is done to estimate points of time in the recording that a change of speaker or audio event occurs 815a-g. This segmentation technique is motivated by a Bayesian information criterion (BIC) speaker segmentation approach. This step comprises modelling each first feature segment element based on the extracted features therein and speech characterisation models, in particular, the UBM 835. Then consecutive modelled first feature segment elements in the first feature set (K2) are compared to identify speaker changes sequentially between modelled first feature segment elements in the first feature set 845. Similarly, the features of the second feature set (K4) are modelled and compared consecutively to identify speaker changes 840. An example is shown in more detail in FIGS. 9 and 10, the input to the process is the extracted features 1020, which are linearly segmented based on 2 second and 4 second intervals (K2 & K4) 910 and the UBM. FIG. 10 illustrates the same portion of a recording linearly segmented based on 2 second intervals 1010 (segments 1010*a-n*) and 4 second intervals 1005 (segments 1005*a-m*). Each linear segment (2 s and 4 s) is modelled by extracting Baum-Welch (BW) statistics using the UBM 920, and the segment modelled using MAP/UBM adaptation 930. A similarity/distance score is then calculated as a measure of the similarity or difference between adjacent segments 940. A speaker change is identified when the similarity to a previous segment exceeds the similarity to the next segment 950. Labels are generated identifying each identified speaker change 1015*a-e* and 1025*a-d*.

Speaker Segmentation

An outcome of the speaker change detection for the K2 1015 and K4 1025 is shown in FIG. 10. It can be observed from this example that for the 2 second segmented (K2) input set 1010, there are 5 speaker changes detected 1015*a-e* and for the 4 second segmented (K4) input set 1005, there are 4 speaker changes detected 1025*a-d* and the position of the detected speaker changes 1015*a-e*, 1025*a-d* can be different between the two samples due to the different segment length. The difference in number and position of changes is due to the different modelling outcomes for the 2 and 4 second segments.

In the exemplary embodiment, the speaker segmentation processing uses maximum a posteriori (MAP) adaptation to model segments using the UBM 920. This modelling provides models that are adapted from background data about the speech environment, which can provide more accurate models.

In the exemplary embodiment, cross-likelihood ratio (CLR) methodology is then used to compare similarity of adjacent segments. This is done by computing a similarity or distance score 940 and determining whether the similarity of a segment to its previous segment exceeds the similarity of the segment to the next segment 950, if so then a speaker change is flagged between the segment and the next segment. It should be appreciated that the timing for detection of the speaker change is within 2 or 4 seconds, for K2 and K4 sets respectively, in this embodiment due to the linear segmentation lengths. Higher or lower resolution may be achieved in other embodiments by adjusting the linear segmentation lengths.

It should be appreciated that any type of modelling and similarity/distance comparison can be used. There are currently no systems which utilise MAP and CLR for segmentation in the manner used in embodiments of the present invention. The methodology can have accuracy advantages over other comparison methodologies. For example, an alternative comparison methodology uses Bayesian information criteria (BIC), however MAP has an advantage of providing more detailed models which can be more accurately compared using CLR as opposed to raw features and BIC segmentation.

In the BIC approach, two adjacent segments are compared by modelling each segment independently, as well as merging and modelling their merged data. The merged model is then compared against the two independent models using the BIC metric to decide if a merged model is a better fit for the data than the independent models.

In the exemplary system embodiment, each segment is modelled using the UBM and a maximum a-posteriori (MAP) adaptation approach. The merged and independent models of adjacent segments are then compared using the cross-likelihood ratio (CLR) metric, for comparing speaker models adapted using a UBM. This stage thus identifies segments of audio, within a processed chunk, that are homogeneous with respect to speaker identity.

Given two segments i and j, and their associated feature vectors $x_i$ and $x_j$, respectively, the pairwise CLR score $a_{ij}$, which measures the similarity of the two segments with respect to their speaker identity, is computed as:

$$a_{ij} = \frac{1}{K_i}\log\frac{p(X_i|M_j)}{p(X_i|M_{UBM})} + \frac{1}{K_j}\log\frac{p(X_j|M_i)}{p(X_j|M_{UBM})}, \quad \text{Equation [16]}$$

where, $K_i$ and $K_j$ represent the number of feature vectors in $x_i$ and $x_j$, respectively. $M_i$ and $M_j$ are the JFA models adapted using the UBM and the data in $x_i$ and $x_j$, respectively. $p(x|M)$ then denotes the likelihood of the data x, given the segment's JFA adapted model M, and $M_{UBM}$ is the UBM representing the general speaker population.

As discussed above, in JFA modelling, $\Sigma$ is a CF×CF diagonal covariance matrix containing each of the c GMM components' diagonal covariance matrix, $\Sigma_x$ of dimension F×F. Using this, for a given speaker model M of c (c={1, ..., C}) mixture components, adapted using the data in x, the zeroth, first and second order Baum-Welch (BW) statistics can be obtained. The zeroth order statistics are defined as $N_c$, the total number of observations that are accounted for by the given mixture component. The first and second order statistics are then computed as, $$F_c = \Sigma_{k=1}^{K}(x_k - m_c) \quad \text{Equation [17]}$$

$$S_c = \text{diag}(\Sigma_{k=1}^{K}(x_k - m_c)(x_k - m_c)^*) \quad \text{Equation [18]}$$

where the sums extend over the K observations in $x_k$ that are aligned with the given mixture component c, and $m_c$ is the mean vector of the $c_{th}$ component and a block within the mean supervector m.

Now let N be a CF×CF dimensional diagonal matrix consisting of each component's diagonal clock $N_c$. Let F be a CF×1 dimensional vector achieved by concatenating $F_c$ of each component. Finally, let S be a CF×CF dimensional diagonal matrix containing the per-component diagonal blocks $S_c$. using this, the likelihood function providing the likelihood of a segment x given a JFA adapted model M, can be calculated using:

$$\log p(x|M) = \sum_{c=1}^{C}\left(N_C \log\frac{1}{(2\pi)^{\frac{F}{2}}|\Sigma_c|^{\frac{1}{2}}}\right) - \quad \text{Equation [19]}$$
$$\frac{1}{2}tr(\Sigma^{-1}S) + Z^*\Sigma^{-1}F + \frac{1}{2}Z^*N\Sigma^{-1}Z$$

where N and F of each segment were obtained over each component, c of UBM. In addition, F is centralised on the UBM mean mixture components, $m_C$, to obtain $\hat{F}$, using, $$\hat{F} = \Sigma_{k=1}^{K} p(c|x_k, M_{UBM})(x_k - m_c) \quad \text{Equation [20]}$$

which in the context of JFA modelling is achieved through, $$\hat{F} = F - NM_{UBM} \quad \text{Equation [21]}$$

The computation of the pairwise CLR measure, between the adapted JFA models, can thus be formulated as:

$$CLR = \frac{1}{K_i}\left[(Z_j - Z_{UBM})^*\Sigma^{-1}\hat{F}_i + \frac{1}{2}Z_j^*N_i\Sigma^{-1}Z_j - \frac{1}{2}Z_{UBM}^*N_i\Sigma^{-1}Z_{UBM}\right] + \frac{1}{K_j}\left[(Z_i - Z_{UBM})^*\Sigma^{-1}\hat{F}_j + \frac{1}{2}Z_i^*N_j\Sigma^{-1}Z_i - \frac{1}{2}Z_{UBM}^*N_j\Sigma^{-1}Z_{UBM}\right]$$

Equation [22]

where, $Z_i$, $Z_j$ and $Z_{UBM}$ represent $M_i$, $M_j$ and the UBM $M_{UBM}$, respectively and are the sum of the speaker and channel supervectors for the associated segments. $K_i$ and $K_j$ represent the sum of occupancy counts associated with the features of the segments i and j, respectively, at each component, c, of the UBM, $M_{UBM}$.

A large CLR value corresponds to a higher similarity between the compared speaker segment models, and as such the CLR is considered a similarity metric. The CLR measure thus carries out a pairwise similarity between two segments by quantifying how well each segment is represented by a model constructed using the data in the other segment over the likelihood of each segment being produced by the general speaker model in $M_{UBM}$. This likelihood ratio provides a comparison as two segments that are considered to be produced by the same speaker should achieve a higher likelihood, given their competing segment's model rather than the general UBM model. If we go back to the computation of the CLR metric presented in Equation 16, $$a_{ij} = \underbrace{\frac{1}{K_i}\log\frac{p(X_i\mid M_j)}{p(X_i\mid M_{UBM})}}_{T_i} + \underbrace{\frac{1}{K_j}\log\frac{p(X_j\mid M_i)}{p(X_j\mid M_{UBM})}}_{T_j},$$

Equation [23]

it can be observed that the CLR computation can be split into the two term, $T_i$ and $T_j$. When comparing two segments i and j, a positive $T_i$ value indicates that the data in segment i is better represented by a model obtained from segment j, than a general speaker model represented by the UBM $M_{UBM}$, and hence the two segments i and j can be merged. On the other hand, a negative $T_i$ value indicates that the general speaker model $M_{UBM}$ is a better representation of the data in segment i than a model obtained from segment j, which indicated that a merge is not recommended. This is similarly true when interpreting a positive, or negative, $T_j$ value. In addition, it can be seen that a $T_i$ or $T_j$ value of zero indicates that the general speaker model provides just as good a representation as the competing segment model.

In an ideal case, when analysing two segments uttered by the same speaker, it is expected that both $T_i$ and $T_j$ would be positive with approximately the same value (ratio of 1) due to the normalisation of each term using $K_i$ and $K_j$ respectively. Such a scenario would indicate that each segment is better represented by its compared segment model than by the UBM. This is while, for two segments uttered by different speakers, negative $T_i$ and $T_j$ values are expected, as well as a larger difference or less correlation, between the $T_i$ and $T_j$ scores. This brings about a theoretically sound decision boundary for deciding a merge, which can be represented by $T_i = (-T_j)$, indicating that an $a_{ij}$ value of 0 should ideally provide a satisfactory decision threshold for merging of speaker segments, which is also used in the system for deciding merging two neighbour segments.

The model pairs with scores above a CLR threshold of 0.0 are then merged using complete-linkage clustering. This method is proposed by the inventors for fast speaker clustering using UBM adapted JFA speaker models.

An advantage of performing speaker change detection is that the set of feature elements for contiguous segments for a single speaker—as identified through speaker change detection—can be combined into one speaker model for the group of contiguous segments and thereby provide a more detailed model for the speaker than is possible form any one segment. Thus, enabling clustering to be performed using more detailed models which can improve the accuracy of the clustering outcomes. Speaker segmentation also enables the computational load for JFA modelling and clustering to be reduced by utilising the output of speaker change detection to reduce the number of comparisons required—each speaker contiguous segment rather than each K2 or K4 segment. The comparisons also utilise the more detailed models.

Speaker Clustering

The aim of clustering is to group speech segments that are similar to each other. The exemplary embodiment of the system uses complete linkage clustering (CLC) to find identical speakers within a chunk. In this approach, a distance metric is used to find the distance between each pair of clusters. A merge is performed on the cluster pair with the lowest distance. This process is done until the lowest distance is not lower than a pre-specified threshold. In CLC, the distance between each two clusters is calculated as the distance between the most distant elements in them. The advantage of this approach is that it speeds up the process of clustering, as there is no need to recalculate the distance between clusters in each step.

Speaker clustering is performed, on each of the K2 855 and K4 850 sets, to assign similar speech segments to the same group to indicate they are uttered by the same speakers. The speaker clustering step is needed to cluster the segments together and determine speaker labels for segments in a chunk. In the exemplary embodiment this clustering approach is applied to each audio chunk, and also between segments of different audio chunks.

The input to the speaker clustering step is the output from the speaker change detection 1015, 1025 which provides first grouping of adjacent linear segments between speaker changes. Based on this speaker segmentation (new segmentation) the speaker based segments are modelled. Using the MFCC features for the new segments and UBM as input, the BW statistics for the speaker segments are determined using the UBM 1120, the segments are them modelled using JFA/UBM adaptation 1130. The modelling uses joint factor analysis (JFA) adaptation to model segments using the UBM. This modelling provides speaker models that are not sensitive to variations in the background recording environment or recording device, also referred to as session variation. Another advantage of this approach is maximising the distance between data from independent speakers, while minimizing the distance between the same speaker's data.

Different speech segments resulting from the speaker change detection stage 1015*a-e*, 1025*a-d* are considered as primary clusters. CLC starts with calculating the distance between each two feature vectors in primary clusters and stores them in memory.

After calculating the distances, in an iterative process, the longest distance between each two pair of clusters is considered as the distance between the two clusters and the lowest cluster distance is chosen to decide which two clusters (i.e. 1015*a* and 1015*d*, 1025*b* and 1025*d*) should be merged, as having the same speaker (i.e. 1030*a*, 1040*b*). This process is continued until the lowest cluster distance is above a pre-specified threshold.

Figure 12:
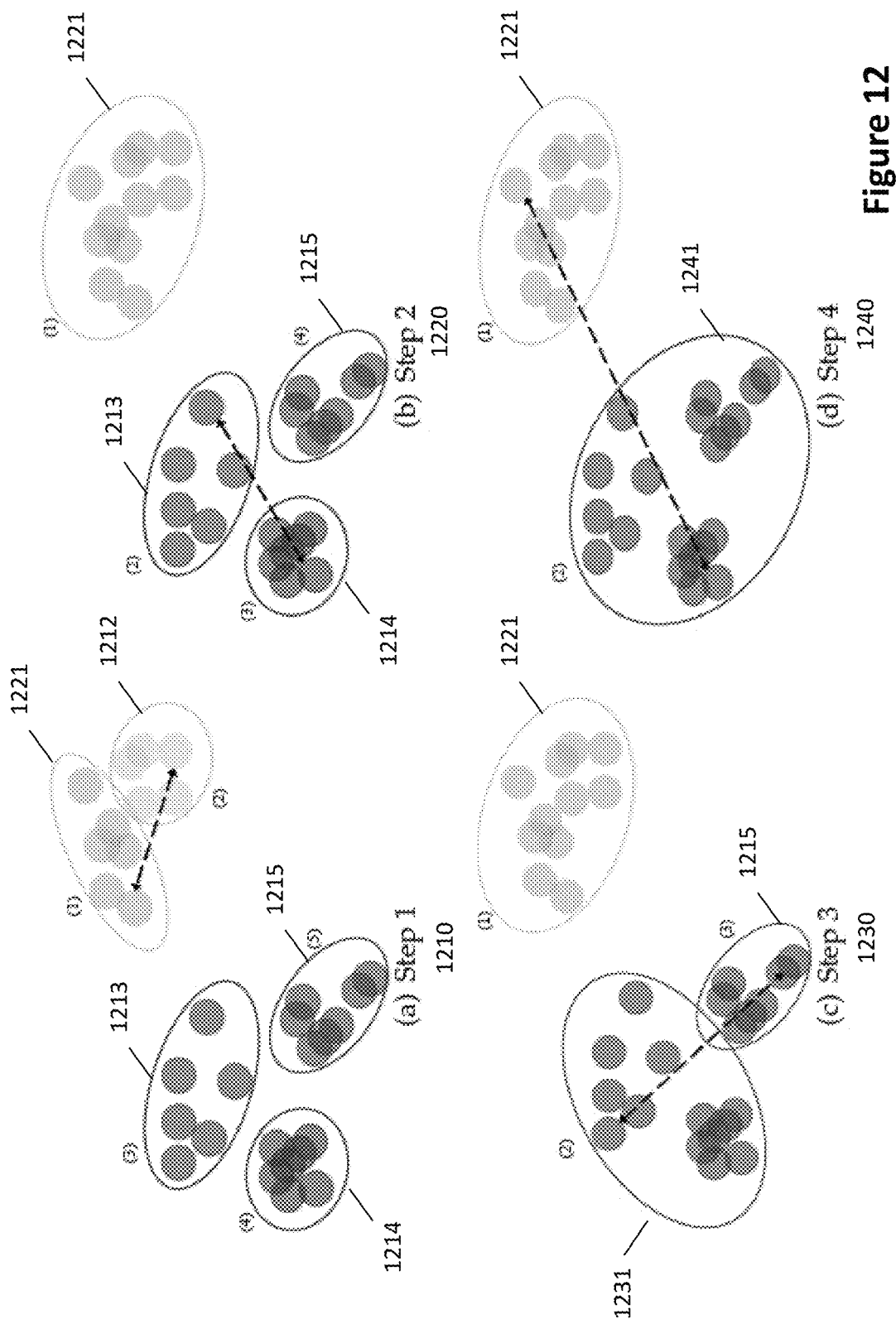
FIG. 12 illustrates a simplified example of clustering decision making.

An example will be discussed with reference to FIG. 12 which illustrated different stages of a clustering process. The clustering process is shown in FIG. 12 in a 2-D space with 5 primary clusters. This is a simplified illustrative example as in the exemplary embodiment of the invention, the clustering space is 40 dimensional, as the feature vectors are 40-D vectors.

Once the speaker segments are modelled 1130 the system uses cross-likelihood ratio (CLR) to compare similarity of all pairs of segments. For this comparison a similarity/distance score is computed between all pairs of segments 1140. In the exemplary embodiment, using the similarity/distance scored the segments are clustered using a hierarchical complete-linkage clustering. In linkage clustering, the two most similar segments are merged hierarchically until a stopping criterion is reached. As FIG. 12 shows, in the first step 1210, clusters 1211 and 1212 are merged, as they have the lowest distance. This is illustrated in step 2 1220 as a new cluster 1221. After each merge a new similarity score between the new segment and all other segments needs to be calculated. In complete linkage clustering this new score, between a segment and the new cluster is computed as the worst score out of all existing scores between that segment and the segments that belong to the cluster. It is therefore a pessimistic clustering approach that provides a simplistic approach to penalizing wrong merges.

As shown in the example of FIG. 12, in step 2 1220 the lowest distance is now between clusters 1213 and 1214, resulting in a decision by the system to merge these clusters to form new cluster 1231. As shown in step 3 1230 the newly calculated distance between original cluster 1215 and new cluster 1231 indicates these clusters should be merged to form new cluster 1241. After 4 steps 1240, the distance between clusters is above a threshold, so the clustering is stopped, resulting in two final clusters 1221 & 1241. In the exemplary embodiment, the clustering is performed until no similarity scores are left that are above zero.

Where individual speaker JFA hyperparameter models are available these models may be input to the above processing to potentially improve clustering outcomes by providing actual known individual speaker data for the unknown speaker segment models to cluster to or be distinguished from. JFA hyperparameters are used to represent a learned space that is discriminative with respect to speaker identity. The known speaker models (which themselves are obtained by using known speaker information and then projected into the JFA space) are participated into the clustering process to attract segments of speech that may be from those specific speakers. Thus, allowing the system to determine that all the audio segments that clustered into this cluster (of segments) guided by the known speaker model, must have been from this known identity.

During the clustering process the speaker homogenous sections are compared against each other and the known speaker models. All speaker comparisons are carried out in the JFA space. The JFA hyperparameters allow projection of audio information into this space, with minimal unwanted information, allowing focus on discriminating between speaker identities. This can be performed for any segment of audio, however if this is done with a segment of audio that was produced by a known speaker, say John, then the system has JFA adapted models for John. JFA models for unknown segments of speech are then JFA adapted and checked them against the known model for John, determine if any of these segments appear to be spoken by John. If we don't have John's speech, and therefore no known model to use for comparison, the system can at least compare the unknown segments to each other, to say that some were form one speaker/source and others from another speaker/source.

Having the known speaker models included helps guide the clustering process. More data being available to the system for speaker segment clustering can improve the clustering outcomes, for example higher likelihood of correctly identifying all segments spoken by the same speaker. In some instances, by including known trained JFA hyperparameter spaces in the clustering process, the unknown clusters may converge more quickly, using less iterations, than where the clustering is performed on unknown speaker segments alone. However, this may not always be the case. The main value of inclusion of the know speaker data is improving the accuracy of the clustering resulting in less miss-classification of speaker segments.

It should be noted that the inclusion of the trained JFA hyperparameter spaces into the clustering process is optional. If such known speaker trained models are not available "blind" clustering using same speaker segment models should result in same speaker clusters being identified based on the distances between same speaker segment models.

In the exemplary embodiment CLR scores are used to perform complete-linkage clustering between segments. However, it should be appreciated that any type of modelling and similarity/distance comparison can be used. There are some systems that use JFA and CLR for clustering, but they do not use complete-linkage clustering.

As discussed above this clustering is performed to identify different segments within the K2 and K4 sampled sets which are uttered by the same speaker. As illustrated in FIG. 10, this can result in different speaker clustering outputs 1030*a-c* 1040*a-d* for the K2 speaker clustering 1030 and K4 speaker clustering 1040. The next processing step compares these speaker clustering outputs 1030, 1040 to output an overall clustering decision for the chunk 1060.

Voice Activity Detection

An additional speech/non-speech classification is performed on K2 segments 830. The voice activity detection (VAD) step is typical in a speech signal processing task. In the exemplary embodiment the VAD processing is performed based on the speech 832 and non-speech 834 GMM models. For this process in the exemplary embodiment the system takes the 2 second linear segmentation extracted features 1010 and based on the extracted features (i.e. Mel-frequency cepstral coefficients) and the speech and non-speech GMMs determines a log likelihood score of a 2 second segment being speech or non-speech. Thus, each 2 s segment is classified (labelled) as speech or non-speech based on the outcome of this analysis. The output of this process is a set of labels indicating which segments are speech and which are non-speech.

In the exemplary embodiment the VAD is based on Mel-frequency cepstral coefficients and thus it is essential that the features are exactly the same as those extracted for system training, wherein the GMM speech and non-speech models are generated. However, it is possible that other VAD methodologies may be used. For example, VAD may be based on any frequency domain representation of the audio.

The set of speech and non-speech segment labels for an audio chunk can be input to the within chuck clustering process as described below.

Cluster Voting

As mentioned earlier, the process of speaker change detection and speaker clustering is performed on each of the segmentation scenarios. The results of speaker clustering of K2 1030 and K4 segments 1040 and the result of speech/non-speech classification 1050 of K2 segments is passed to the final step, which is called cluster voting to make the final decision for diarisation of each chunk. To achieve the final within chunk diarisation result 1060, results of these three segmentations scenarios need to be merged.

Cluster voting is a method developed by the inventors for merging multiple clustering decisions into a single decision. In cluster voting in the exemplary embodiment, the diarisation decisions obtained in each segmentation case after clustering are assessed to identify the number of times that each 2 second segment was clustered to each of the other segments.

The inputs to the cluster voting process are the three clustering decisions are available:
  A speech/non-speech label, indicating which segments are speech and which are non-speech every 2 seconds 1050.
  A speaker label based on the 2 second segmentation input 1030.
  A speaker label based on the 4 second segmentation input 1040. This input may also be expressed as a label for every 2 seconds (for example, the same label will be repeated in a 4 second segment, every 2 seconds).

Cluster voting computes a pair-wise score between segments, using the three labels. This score shows how many times a segment was attributed to another segment, across the three different decisions. This allows for constructing a voting matrix, which is a square matrix that displays the pairwise score between each of the 2 second segments within the analysed chunk.

In each label, a two second segment can only once be attributed to the same label as another segment, as segments will have one label in each decision. This means over three decisions, a segment can be attributed to another segments a maximum of three times, and a minimum of zero times. This value serves as a pair-wise score between 2 second segments. These scores (votes) are then clustered using complete-linkage clustering to merge the final three decisions in an intuitive manner.

This score matrix is used to carry out complete-linkage clustering (as discussed above) using a voting threshold of 2 votes. This means that should a segment share decision labels with another segment twice or more, from across the multiple different diarisation decisions, they will be clustered into the same cluster.

The final output of the cluster voting 1060 is a single set of labels identifying the speaker changes and speaker identifiers for each section 1060a-c of speech, and non-speech sections within the audio chunk 1060.

Soft Speech Activity Detection

An optional step can be performed to identify non-speech and substantially non-speech sections and discard or suppress these sections for the following between chunk processing. This can reduce the processing load for the final between chunk comparison.

In this final stage, the final decision label for each section of a chunk is analysed against the speech/non-speech labels of the voice activity detection (VAD) module. The unique speakers/clusters within a recording, as determined by the decision labels, are each assessed against the speech and non-speech background models using the log likelihood ratio metric (VAD processing). If the likelihood of a speaker cluster is lower when assessed against the speech model than against non-speech model, it is discarded or suppressed as non-speech and only the labels for and models for the active speech clusters/speakers are maintained.

For example, if a particular label in the final segmentation decision contains less than 10% of speech (as decided by the VAD module), it is marked as non-speech and the label is removed. This non-speech suppression feature is not known in any current diarisation system. The non-speech suppression has the advantage of reducing clustering load for final between chunk speaker clustering/linking and speaker identification.

Between Chunk Diarisation/Speaker Linking

Figure 8B:
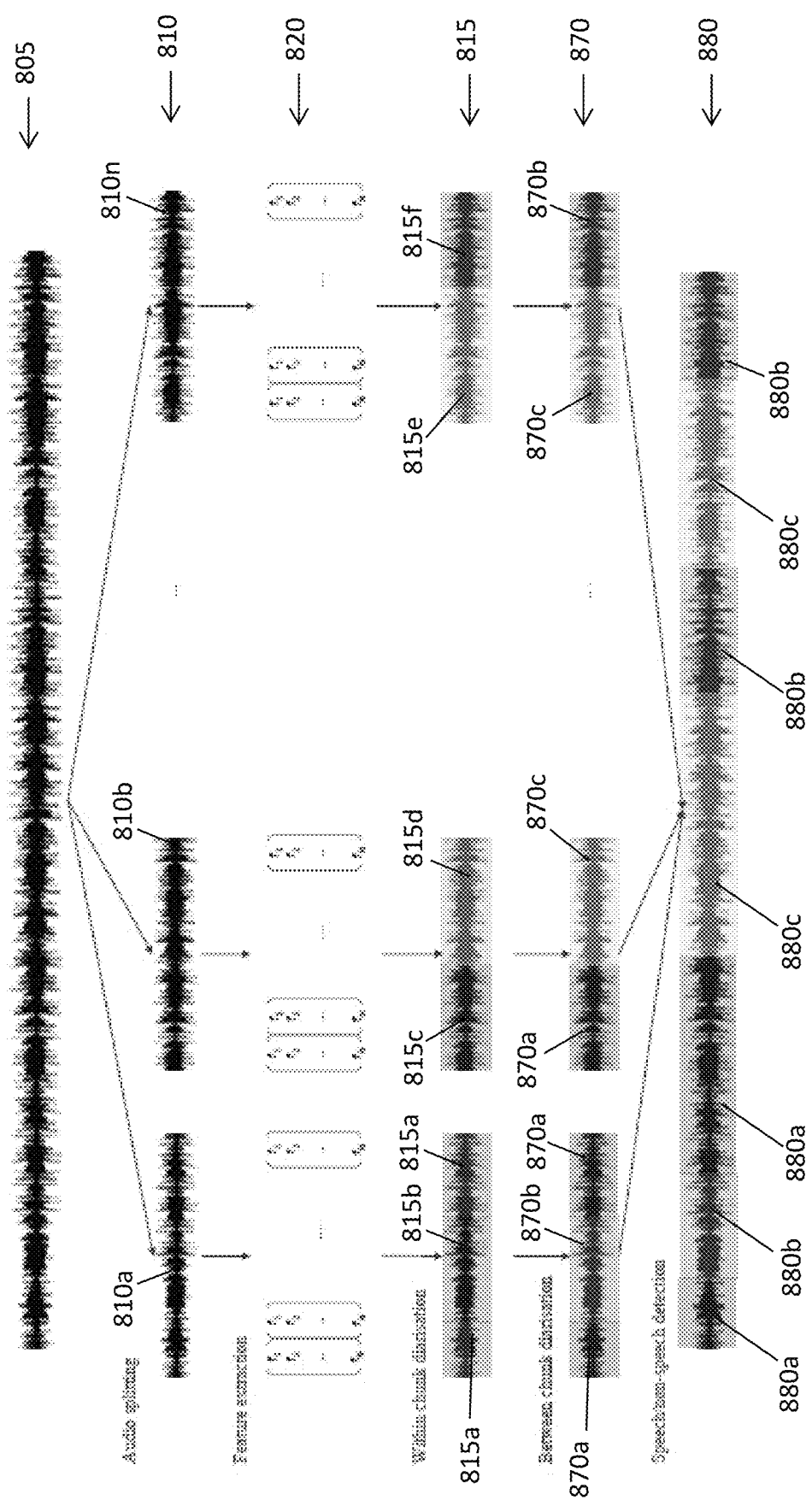
FIG. 8B illustrates the outputs during steps of the evaluation process shown in FIG. 8A.

As was previously shown, each chunk was processed using within-chunk and then between-chunk diarisation. As illustrated in FIG. 8B, after identifying unique speakers within a chunk 815, the next step is to link these speakers across all chunks within a recording to identify the unique speaker identities within that recording 870. This stage of the system then begins by first concatenating the labels for each processed chunk into a global decision label. The global label thus provides one set of labels for the entire recording.

Figure 13:
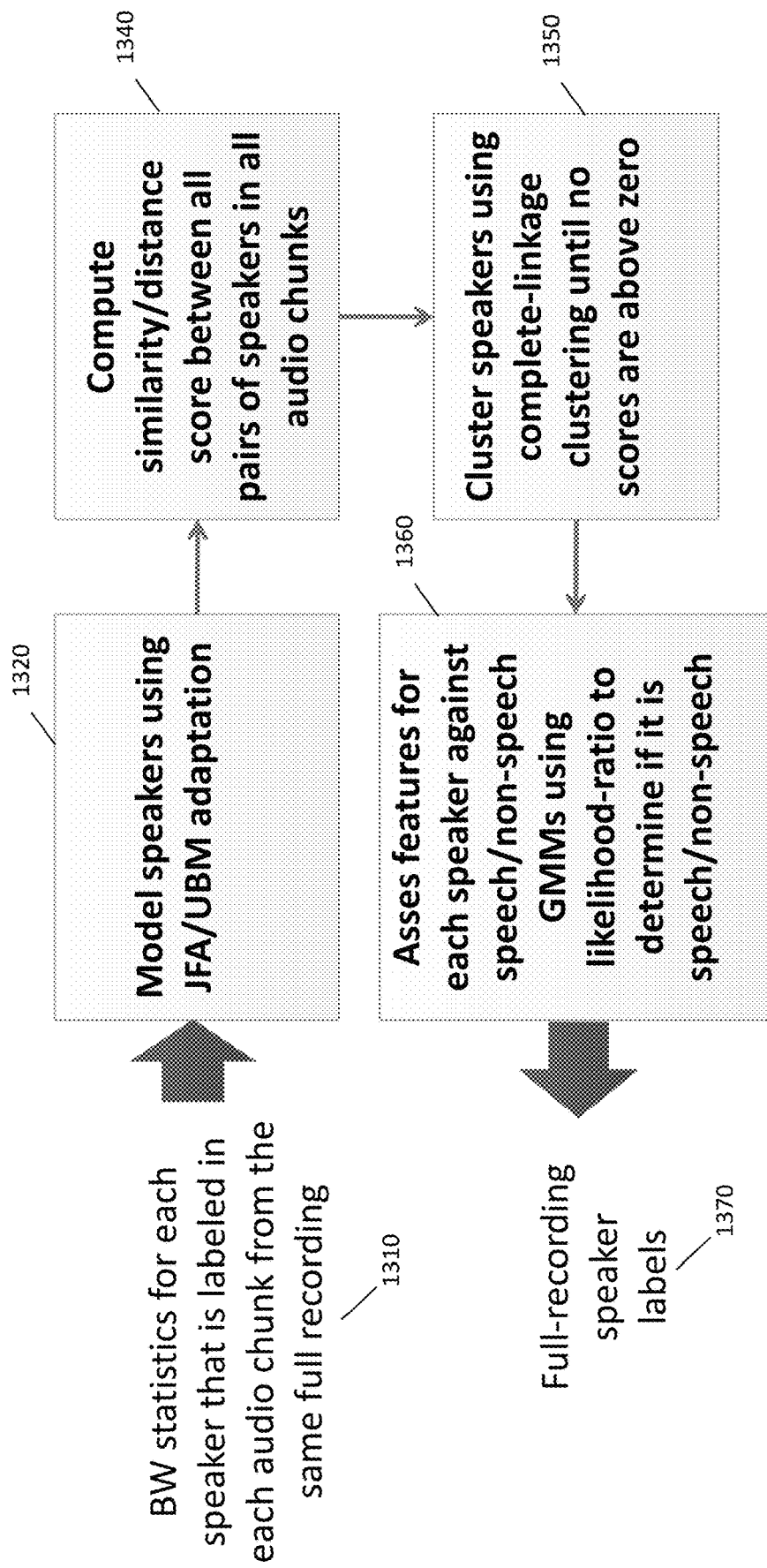
FIG. 13 is a flowchart of an example of a between chunk speaker linking and labelling process.

This process is described with reference to FIG. 13, input to this process the Baum-Welch statistics for each of the within-chunk speakers are loaded 1310 and employed to train JFA adapted models using the UBM 1320, using processing as described above. These models are then compared 1340 using the CLR similarity measure and clustered using complete-linkage clustering at a CLR stopping threshold of 0.0 1350. Thus, clustering is performed to identify common speakers between chunks and the within chunk speaker identification labels updated accordingly 870 and the chunks and diarisation labels concatenated to provide a fully diarised recording 880. An additional step can be performed 1360 to again assess the features identified for each speaker against speech and non-speech GMMs to further distinguish speech and non-speech sections of the recordings. It should be appreciated that the determination between speech and non-speech at this stage is performed using a larger data set, due to the concatenation of sections form each chunk and thus speech and non-speech determinations may differ from the within-chunk assessment discussed above.

Similarly, to as discussed above, where known speaker JFA hyperparameter models are available the additional statistics of known speakers can be utilised during clustering to improve the quality of the clustering process.

After the between-chunk diarisation process is completed, the within-chunk diarisation speaker labels are updated to reflect the global speaker identity labels.

Speaker Identification

In the case that a session is submitted for diarisation and additional global speaker models are provided for identifying specific speakers in a recording session, the additional statistics for the known speakers can be added to the within-chunk clustering process in each employed segmentation case. However, as this is only for the within-chunk diarisation stage, the true speaker identities are not yet assigned, and this is done to guide the speaker clustering process in each segmentation scenario with known additional speaker information. The guided within-chunk results are then passed on to the between-chunk diarisation stage.

After the between-chunk speaker diarisation stage, the final global speaker labels do not reflect the true identity (real speaker names) of the speakers. This is because the system has no previous knowledge of the true global identity of a speaker. In order to allow for true labelling using the speaker identification approach, additional true global speaker models are added to the clustering stage of the between-chunk module. These models are then included in the final clustering of the within-chunk speakers across all the chunks belonging to a full recording session.

The true speaker models are trained hyperparameter spaces for individual speakers and each model is also associated with a known true identify of a speaker. The speaker identification is performed by comparison of the identified speakers from within the recording with the true speaker models. The final speaker-specific segments within a session can be labelled with their true speaker identities if a matching similarity score (CLR>0:0) is observed between an added true speaker model and the final speakers obtained by the system.

It should be appreciated that in some embodiments of the system it may not be necessary for the system to perform actual speaker identification (recognition of speaker identity). In such embodiments the training of hyperparameters for individual speakers is not necessary. In such systems the UMB, speech GMM and non-speech GMM only may be trained or provided. In the evaluation phase these models are applied to identify speaker changes and distinguish between different speakers within the recording. The system may apply speaker identification labels to sections of speech attributed to different speakers within the recording, but the actual identity of the individual speaker will not be identified by the system. For example, the system may apply generic identifiers such as speaker 1, speaker 2 etc. to the individual speakers identified within the recording. The actual speaker identities may be determined during further processing. For example, speaker identity may be determined during a transcription phase automatically based on detection of speaker introductions from transcribed text analysis. Alternatively, the individual speakers may be manually identified.

It should be appreciated that once speaker identities for a recording are known and the recording annotated accordingly, the recording may then be input to the training process as a development recording to generate individual speaker models for later input to automatic speaker identification. For example, on conclusion of processing an unseen recording, a JFA hyperparameter transformation matrix can be developed and stored for each newly identified speaker. Further, retraining of existing speaker hyperparameters may also be performed when new recordings for known individual speakers are identified. Thus, embodiments of the invention may be configured to continually expand and improve true speaker model libraries for input to speaker diarisation.

Figure 14:
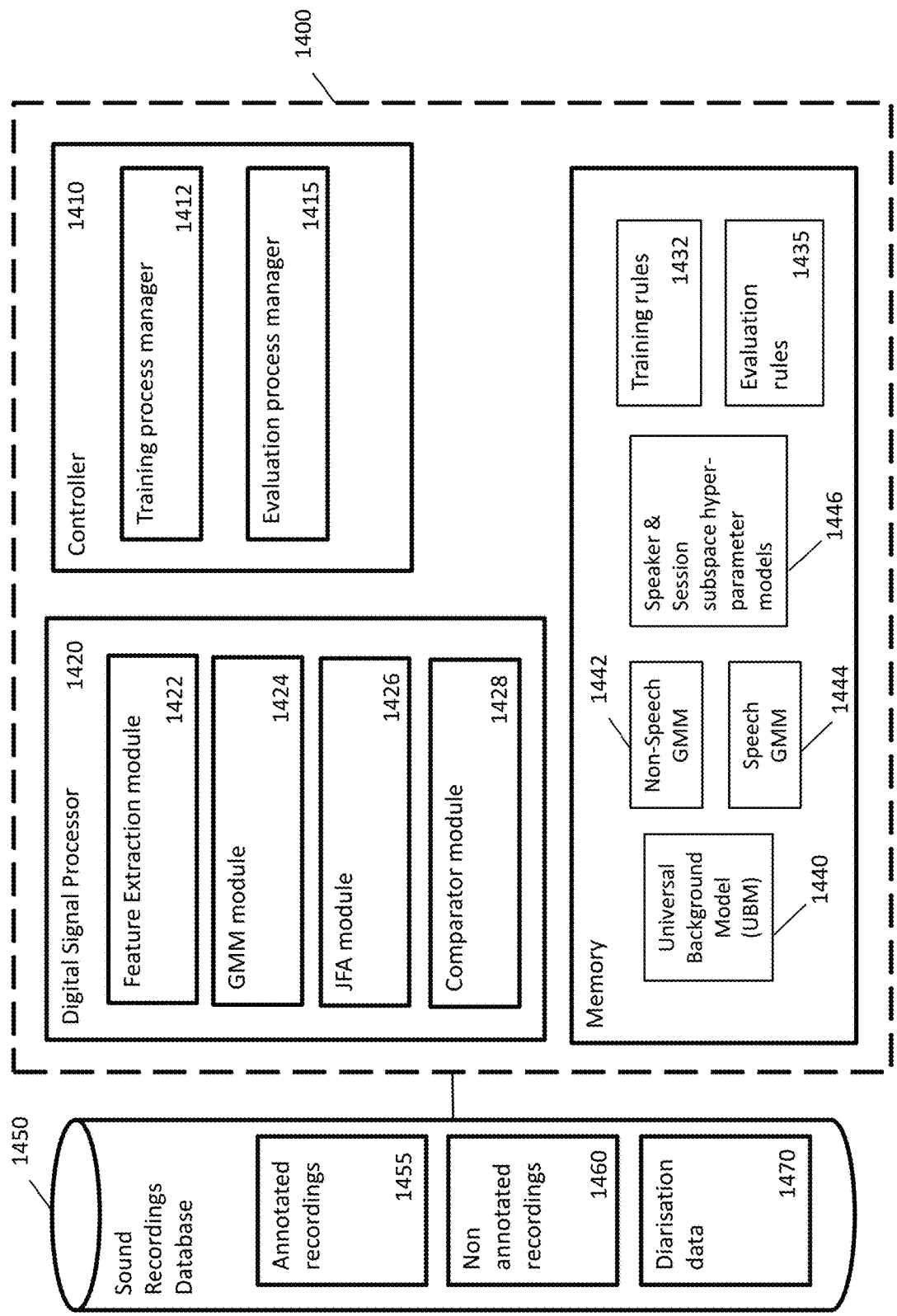
FIG. 14 is a block diagram of an example of a diarisation system.

It should be appreciated that embodiments of diarisation systems in accordance with the present invention can be implemented using a variety of different system architectures. A block diagram of an example of a diarisation system is shown in FIG. 14 illustrating key system modules. In this example the system 1400 comprises a controller 1410, digital signal processor 1420 and memory 1430. The system may include or be configured to access one or more sound recording databases 150 storing annotated recordings 1455, un-annotated recordings 1460 and diarisation data 1470. The system will output diarisation data 1470 from processing unannotated recordings 1460 for input to transcription processing.

The controller 1410 is configured to control the processing for the diarisation training phase 1412 and evaluation phase 1415, for example executing software training process manager software routines 1412 and executing evaluation process manager software routines 1415. The system memory 1430 may store sets of training rules 1432 and evaluation rules 1435 which are applied by the training process manager 1412 and evaluation process manager 1415 accordingly, these set of rules may define user configurable variables for input to the training and evaluation process, for example defining variables such as: audio chunk length, feature framing widow criteria for feature extraction (hamming window parameters), sampling rates for GMM speech and non-speech modelling, decision criteria for clustering etc. The digital signal processor 1420 includes modules configured to perform the key signal processing functions on input data, which are called on during various stages of the training and evaluation processing. For example, the digital signal processor can include a feature extraction module 1422, a GMM module 1424, a JFA module 1426 and a comparator module 1428. The feature extraction module 1422 is called in both the training and evaluation phases to perform feature extraction on the input sound recordings. The GMM module is called in the training phase for UBM training, and for generating the GMM models for speech and non-speech. The JFA module 1426 is called on during the training phase for hyperparameter training to model individual speakers, and also during the evaluation phase for modelling the segments of the audio recording (i.e. K2 & K4 segments, speaker change clustered segments, linked speaker segments etc.) for each different phased of the evaluation phase processing. The comparator module 1428 is configured to perform the model comparison, (for example BIC, CLR, CLC) and is called during each phase of the evaluation processing where comparison decisions between modelled sections are required, the decision criteria such as thresholds and end criteria may be variables configured in evaluation rules 1435.

The training process manager 1412 and training rules 1432 may be optional in some embodiments, where the system is provided with already trained models rather than generating these within the system by execution of a training phase using already annotated recordings 1455.

The block diagram of FIG. 14 is non-limiting in terms of system architecture and a variety of different system architecture scenarios are contemplated for system implementation. For example, the system may be implemented in a computer or server. In another embodiment the system may be implemented in software utilising communication network accessible distributed processing and memory resources (cloud based) which can have an advantage of enabling scalable parallel processing for the computationally intensive modelling within chunk evaluation processing. In another embodiment the controller 1410 and memory 1430 may be implemented in a hardware server configured with specialised digital signal processing resources for implementing the feature extraction 1422, GMM 1424, JFA 1426 and comparator 1428 modules, which may be implemented using functionality specific hardware (for example, application specific integrated circuits ASIC or field programmable gate arrays FPGA). It should be appreciated that any suitable combination of hardware, software and firmware may be utilised to realise embodiments of the system.

It will be understood to persons skilled in the art of the invention that many modifications may be made without departing from the spirit and scope of the invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

The invention claimed is:

1. A method of developing models in an automatic diarisation system comprising a system controller, a digital signal processor and a memory, the method comprising the steps of:
   a) retrieving from the memory one or more annotated audio recordings by the controller, each annotated audio recording comprising an audio file and associated annotation data identifying timing in the file for changes between speakers, changes from active speech to non-speech, and differentiation of individual speakers;
   b) performing, using the digital signal processor, feature extraction on the one or more annotated audio recordings, wherein the feature extraction is performed based on frames of samples, processed to extract speech feature components compatible for reliable modelling using Gaussian mixture modelling (GMM);
   c) using the controller, the controller using the annotation data for accumulating a set of all non-speech features for each recording;
   d) using the controller, the controller forming from the annotation data a set comprising speech features for all speakers for each recording;
   e) developing a universal background model (UBM) for each recording using the set comprising speech features for all speakers for each recording, wherein the universal background model (UBM) is developed as an extensive Gaussian mixture model using an Expectation-Maximisation (EM) algorithm;
   f) storing the UBM for input to automated diarisation processing;
   g) performing speech Gaussian mixture modelling (GMM) for each recording using sampled data from the set comprising speech features for all speakers for the recording and storing the speech GMM for each recording;
   h) performing GMM for each recording using sampled data from the set comprising all non-speech features for the recording and storing the non-speech GMM for each recording, wherein the speech GMMs, non-speech GMMs are stored for input to voice activity detection in an automated diarisation process;
   i) using the controller, the controller forming from the annotation data for each recording a plurality of sets of speech features for each speaker, each set representing speech features for a set short time duration, and computing statistics for each set;
   j) performing joint factor analysis (JFA) hyperparameter training for each speaker using the plurality of sets of speech features for the speaker, the computed statistics for the speaker and the UBM to determine characterising speaker JFA hyperparameters for the speaker, and storing the speaker JFA hyperparameters for each speaker;
   k) computing statistics for non-speech features for each set of all non-speech features for each recording;
   l) performing JFA hyperparameter training for non-speech using the set of all non-speech features for each recording, the computed statistics for the non-speech and the UBM to determine characterising non-speech JFA hyperparameters for non-speech, and storing the non-speech JFA hyperparameters for each recording;
   whereby the speaker JFA Hyperparameters and non-speech JFA hyperparameters are input to speaker identification in the automated diarisation process.

2. The method as claimed in claim 1 wherein in step i) the short time duration l is chosen as a length sufficient to exhibit linguistic variation over the length of the short time duration and to divide a longer period of speech into short time duration segments that can each be treated as a separate session.

3. The method as claimed in claim 2 wherein the short time duration l is chosen from within the range of 5 to 20 seconds.

* * * * *